(12) United States Patent
Uenaka

(10) Patent No.: US 7,764,306 B2
(45) Date of Patent: Jul. 27, 2010

(54) ANTI-SHAKE APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 440 days.

(21) Appl. No.: 11/775,886

(22) Filed: Jul. 11, 2007

(65) Prior Publication Data

US 2008/0012947 A1 Jan. 17, 2008

(30) Foreign Application Priority Data

Jul. 13, 2006 (JP) ............................. 2006-192712
Jul. 13, 2006 (JP) ............................. 2006-192863

(51) Int. Cl.
H04N 5/228 (2006.01)
G03B 17/00 (2006.01)

(52) U.S. Cl. ............................. 348/208.11; 348/208.99; 348/208.7; 396/55

(58) Field of Classification Search .................. 348/208, 348/208.11, 208.99; 396/55
See application file for complete search history.

(56) References Cited

U.S. PATENT DOCUMENTS

| 5,634,142 | A | * | 5/1997 | Imafuji et al. .................. 396/52 |
| 5,724,616 | A | | 3/1998 | Imafuji et al. |
| 5,930,531 | A | * | 7/1999 | Kitagawa et al. ............... 396/55 |
| 5,999,746 | A | * | 12/1999 | Kitagawa ...................... 396/52 |
| 6,263,162 | B1 | * | 7/2001 | Yamazaki et al. .............. 396/55 |
| 6,332,060 | B1 | * | 12/2001 | Miyamoto et al. ............. 396/55 |
| 6,456,789 | B1 | | 9/2002 | Uenaka |
| 6,654,554 | B2 | | 11/2003 | Uenaka |
| 7,224,893 | B2 | | 5/2007 | Uenaka |
| 2005/0200713 | A1 | | 9/2005 | Uenaka |
| 2005/0265704 | A1 | | 12/2005 | Uenaka et al. |
| 2005/0265705 | A1 | | 12/2005 | Uenaka |
| 2007/0003262 | A1 | * | 1/2007 | Shiratori ...................... 396/55 |

FOREIGN PATENT DOCUMENTS

| JP | 7-261233 | 10/1995 |
| JP | 2000-321612 | 11/2000 |
| JP | 2001-159767 | 6/2001 |
| JP | 2005-292799 | 10/2005 |

OTHER PUBLICATIONS

English language computer-generated translation of JP 2000-321612, (see above).
English language computer-generated translation of JP 2001-159767, (see above).
English language computer-generated translation of JP 2005-292799, (see above).

(Continued)

Primary Examiner—David L Ometz
Assistant Examiner—Quang V Le
(74) Attorney, Agent, or Firm—Greenblum & Bernstein, P.L.C.

(57) ABSTRACT

An anti-shake apparatus for image stabilizing comprises a movable unit and a controller. The movable unit is movable for an anti-shake operation. The controller stops the anti-shake operation after an exposure time and moves the movable unit to a first position after the anti-shake operation. The first position is a position of the movable unit before the exposure time and before the anti-shake operation. The controller moves the movable unit at a decelerated, low rate of speed before finishing its movement to the first position.

6 Claims, 13 Drawing Sheets

OTHER PUBLICATIONS

English language computer-generated translation of JP 7-261233, (see above).

U.S. Appl. No. 11/775,887 to Uenaka, filed on Jul. 11, 2007.
U.S. Appl. No. 11/775,891 to Uenaka, filed on Jul. 11, 2007.

* cited by examiner

ANTI-SHAKE APPARATUS

BACKGROUND OF THE INVENTION

1. Field of the Invention

The present invention relates to an anti-shake apparatus for a photographing apparatus, and in particular to the movement of the movable unit to a position so that the shock caused by the impact between the movable unit and the point of contact which stops its movement is mitigated.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2005-292799 discloses an anti-shake apparatus that has a guide supporting the movable unit that moves for the anti-shake operation.

However, this anti-shake apparatus does not have a fixed-positioning mechanism that maintains the movable unit in a stationary position when the movable unit is not being driven (drive OFF state). Therefore, when the anti-shake operation is complete and the movable unit ceases to be driven with its drive status set to the OFF state, the movable unit is allowed to move freely according to the force of gravity, stopping only when it comes into contact with the part at the end of its range of movement. In the case where the movable unit makes contact with this part at a high rate of speed, the impact between the movable unit and the part may be large enough to break the contacting part or cause the operator of the photographing apparatus including this anti-shake apparatus to experience discomfort due to the shock of the contacting part.

SUMMARY OF THE INVENTION

Therefore, an object of the present invention is to provide an anti-shake apparatus (an image stabilizing apparatus) that restrains the shock when the movable unit, without a fixed-positioning mechanism, makes contact with the end of its range of movement after the control driving the movable unit for the anti-shake operation is set to the OFF state.

According to the present invention, an anti-shake apparatus (an image stabilizing apparatus) comprises a movable unit and a controller. The movable unit is movable for an anti-shake operation. The controller stops the anti-shake operation after an exposure time and moves the movable unit to a first position after the anti-shake operation. The first position is a position of the movable unit before the exposure time and before the anti-shake operation. The controller moves the movable unit at a decelerated, low rate of speed before finishing its movement to the first position.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
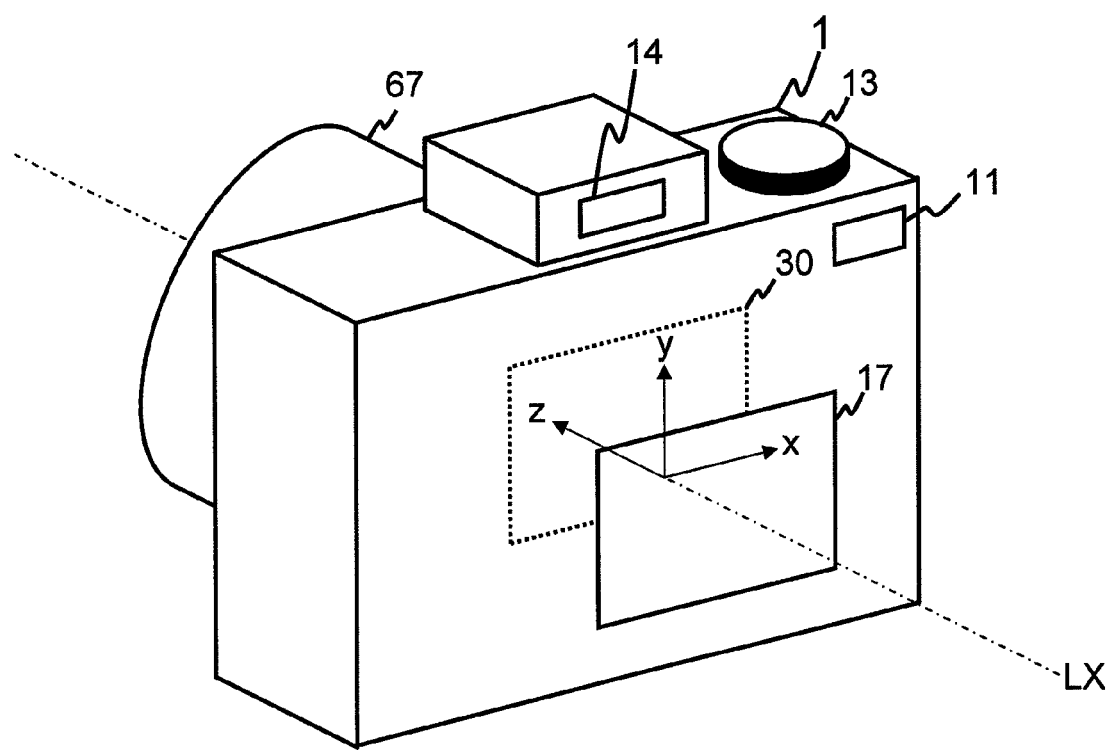
FIG. 1 is a perspective rear view of the first and second embodiments of the photographing apparatus viewed from the back side.

The present invention is described below with reference to the first and second embodiments shown in the drawings. In the first and second embodiments, the photographing apparatus 1 is a digital camera. A camera lens 67 of the photographing apparatus 1 has an optical axis LX.

In order to explain the direction in the first and second embodiments, a first direction x, a second direction y, and a third direction z are defined (see FIG. 1). The first direction x is a direction which is perpendicular to the optical axis LX. The second direction y is a direction which is perpendicular to the optical axis LX and the first direction x. The third direction z is a direction which is parallel to the optical axis LX and perpendicular to both the first direction x and the second direction y.

The first embodiment is explained as follows.

Figure 2:
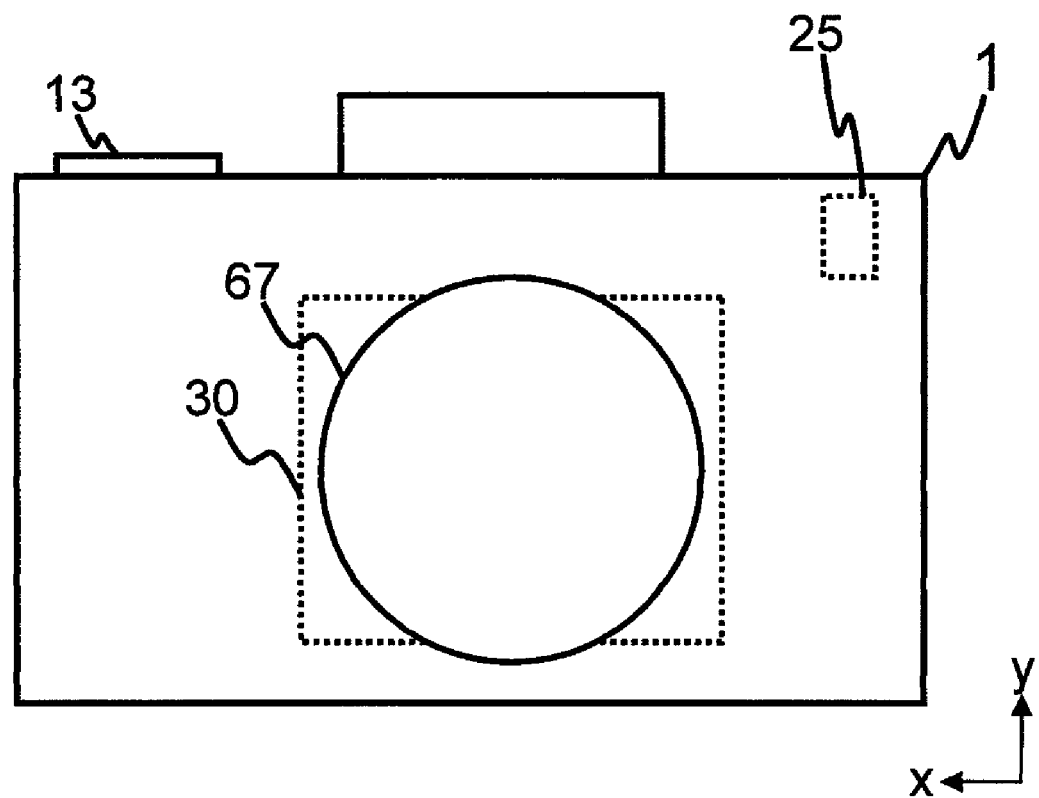
FIG. 2 is a front view of the photographing apparatus.
Figure 3:
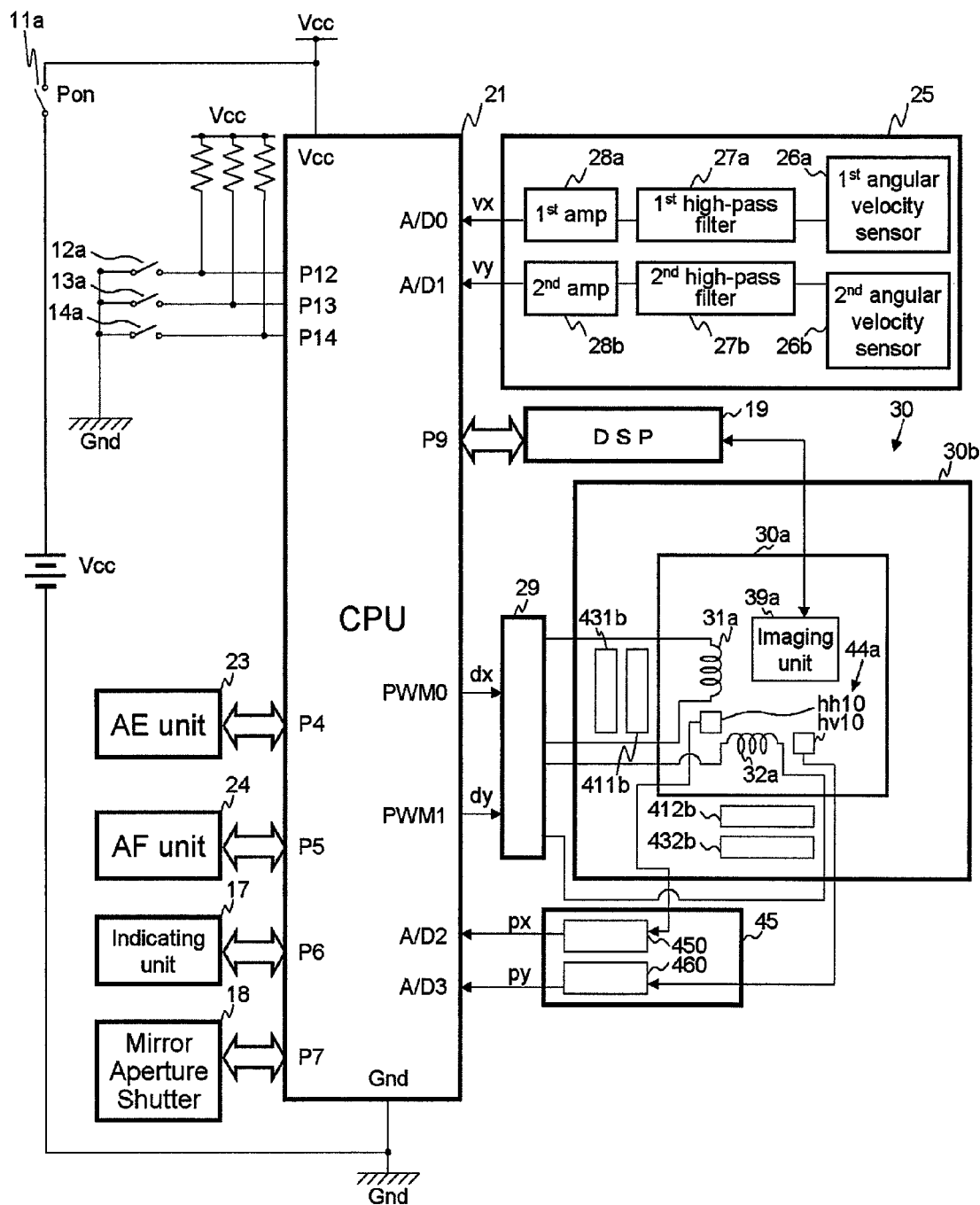
FIG. 3 is a circuit construction diagram of the photographing apparatus.

The imaging part of the photographing apparatus 1 comprises a PON button 11, a PON switch 11a, a photometric switch 12a, a release button 13, a release switch 13a, an anti-shake button 14, an anti-shake switch 14a, an indicating unit 17 such as an LCD monitor etc., a mirror-aperture-shutter unit 18, a DSP 19, a CPU 21, an AE (automatic exposure) unit 23, an AF (automatic focus) unit 24, an imaging unit 39a in the anti-shake unit 30, and a camera lens 67 (see FIGS. 1, 2, and 3).

Whether the PON switch 11a is in the ON state or the OFF state, is determined by the state of the PON button 11, so that the ON/OFF states of the photographing apparatus 1 correspond to the ON/OFF states of the PON switch 11a.

The photographic subject image is captured as an optical image through the camera lens 67 by the imaging unit 39a, and the captured image is displayed on the indicating unit 17. The photographic subject image can be optically observed by the optical finder (not depicted).

When the release button 13 is partially depressed by the operator, the photometric switch 12a changes to the ON state so that the photometric operation, the AF sensing operation, and the focusing operation are performed.

When the release button 13 is fully depressed by the operator, the release switch 13*a* changes to the ON state so that the imaging operation by the imaging unit 39*a* (the imaging apparatus) is performed, and the image, which is captured, is stored.

In the first embodiment, the anti-shake operation is performed only when the release switch 13*a* is set to the ON state during the time of exposure. The movable unit 30*a* is moved to the first position P1 over the course of (while taking the duration of) a predetermined length of time after the exposure time of the imaging operation.

The mirror-aperture-shutter unit 18 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter corresponding to the ON state of the release switch 13*a*.

The DSP 19 is connected to port P9 of the CPU 21, and it is connected to the imaging unit 39*a*. Based on a command from the CPU 21, the DSP 19 performs the calculation operations, such as the image processing operation etc., on the image signal obtained by the imaging operation of the imaging unit 39*a*.

The CPU 21 is a control apparatus that controls each part of the photographing apparatus 1 regarding the imaging operation and the anti-shake operation (i.e. the image stabilizing operation). The anti-shake operation includes both the movement of the movable unit 30*a* and position-detection efforts.

Further, the CPU 21 stores a value of the anti-shake parameter IS that determines whether the photographing apparatus 1 is in the anti-shake mode or not, a value of a release state parameter RP, a value of a mirror state parameter MP, a value of a mirror-down time parameter MRDN, a value of a first previous exposure position parameter RLSPx, a value of a second previous exposure position parameter RLSPy, a value of a first present position parameter PPx, and a second present position parameter PPy.

The value of the release state parameter RP changes with respect to the release sequence operation. When the release sequence operation is performed, the value of the release state parameter RP is set to 1 (see steps S22 to S32 in FIG. 4), and when the release sequence operation is finished, the value of the release state parameter RP is set (reset) to 0 (see steps S13 and S32 in FIG. 4).

Figure 4:
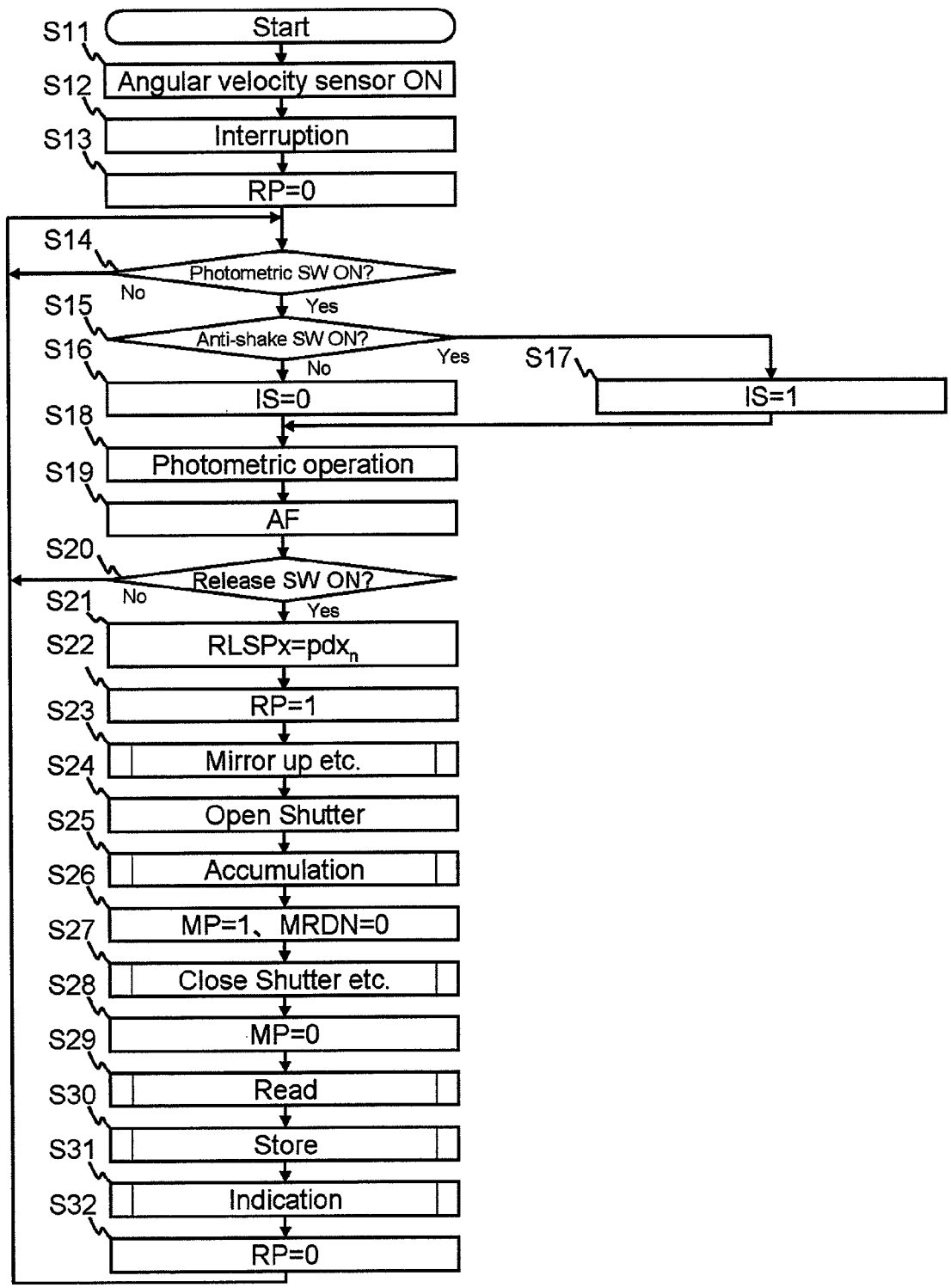
FIG. 4 is a flowchart that shows the main operation of the photographing apparatus in the first embodiment.

When the mirror-down operation is being performed after the exposure time for the imaging operation, the value of the mirror state parameter MP is set to 1 (see step S26 in FIG. 4); otherwise, the value of the mirror state parameter MP is set to 0 (see step S28 in FIG. 4).

Whether the mirror-up operation of the photographing apparatus 1 is finished is determined by the detection of the ON/OFF state of the mechanical switch (not depicted). Whether the mirror-down operation of the photographing apparatus 1 is finished is determined by the detection of the completion of the shutter charge.

Figure 5:
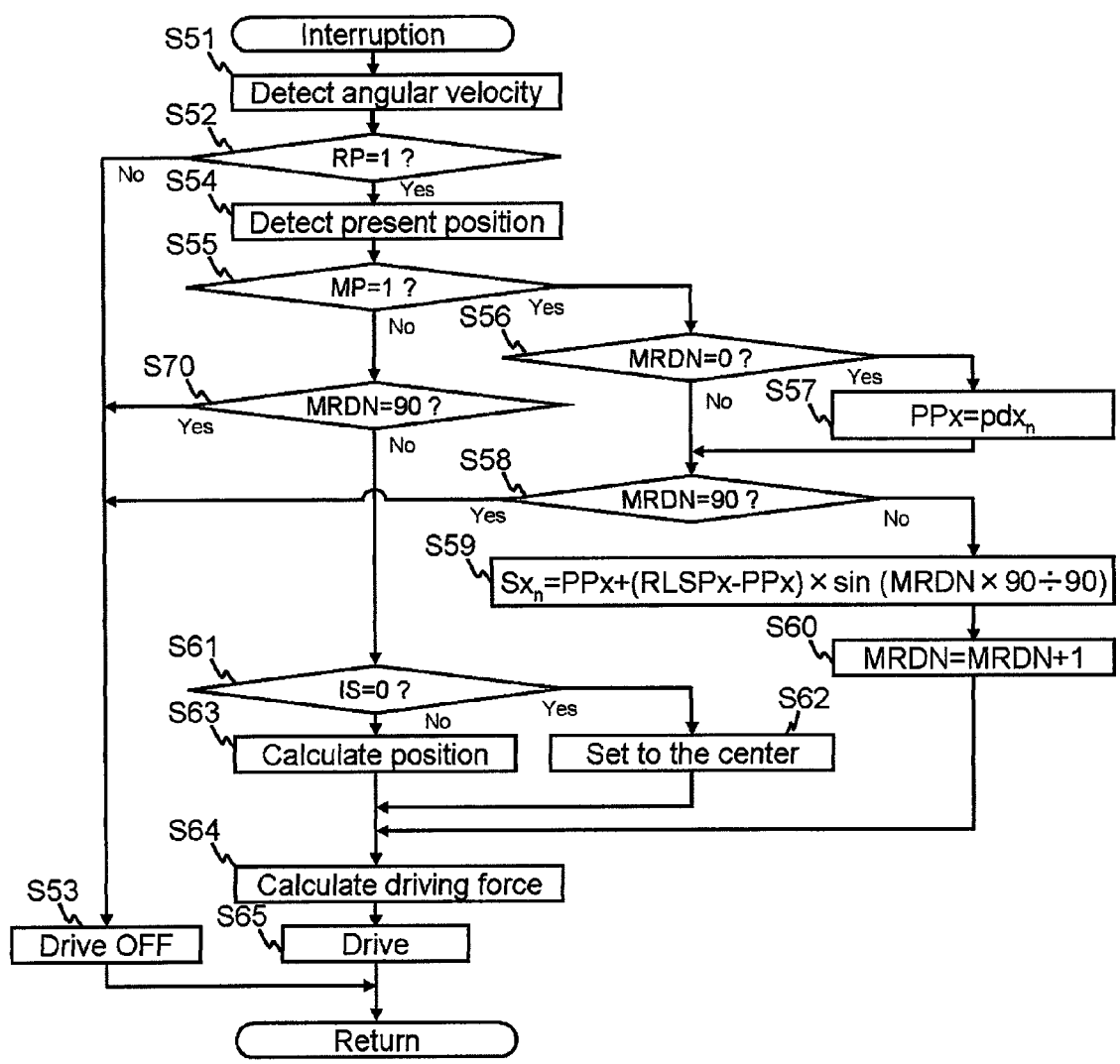
FIG. 5 is a flowchart that shows the detail of the interruption process of the timer in the first embodiment.

The mirror-down time parameter MRDN is a parameter that measures the length of time while the mirror-down operation is performed (see step S60 in FIG. 5).

The CPU 21 stops driving the movable unit 30*a* for the anti-shake operation after the exposure time of the imaging operation (set to the OFF state). If the movement of the movable unit 30*a* for the anti-shake operation is stopped (set to the OFF state) and another driving operation of the movable unit 30*a* is not performed, the movable unit 30*a* drops to the end of the range of movement according to the force of gravity (drop movement).

In the first embodiment, after the movement of the movable unit 30*a* for the anti-shake operation is set to the OFF state, the CPU 21 drives the movable unit 30*a* for a predetermined length of time (90 ms).

Specifically, after the value of the mirror state parameter MP is set to 1, the CPU 21 moves the movable unit 30*a* to a first position P1 while taking the duration of a predetermined length of time (90 ms) to do so. The first position P1 is the position of the movable unit 30*a* in an immediately before the OFF state of driving, in other words, a position of the movable unit 30*a* after the release switch 13*a* is set to the ON state, before the exposure time, and before the anti-shake operation is performed.

At a point in time before the exposure time but after the release switch 13*a* is set to the ON state, the anti-shake operation has not been performed yet, the control driving the movable unit 30*a* for the anti-shake operation is set to the OFF state, and the movable unit 30*a* is located at the end of the range of movement according to the effects of gravity. Therefore, the first position P1 is somewhere at the end of the range of movement.

However, in the case where the magnitude of the movement of the movable unit 30*a* under the force of gravity is small, such as when the photographing apparatus 1 faces towards the up side or down side etc., the first position P1 may be somewhere in the range of movement other than at an endpoint.

In the movement of the movable unit 30*a* to the first position P1, the movable unit 30*a* moves at a low speed immediately before finishing its movement (when the movable unit 30*a* is near the first position P1).

Or, before finishing its movement, the movable unit 30*a* decelerates (slows down) then stops upon completion of the movement.

Figure 7:
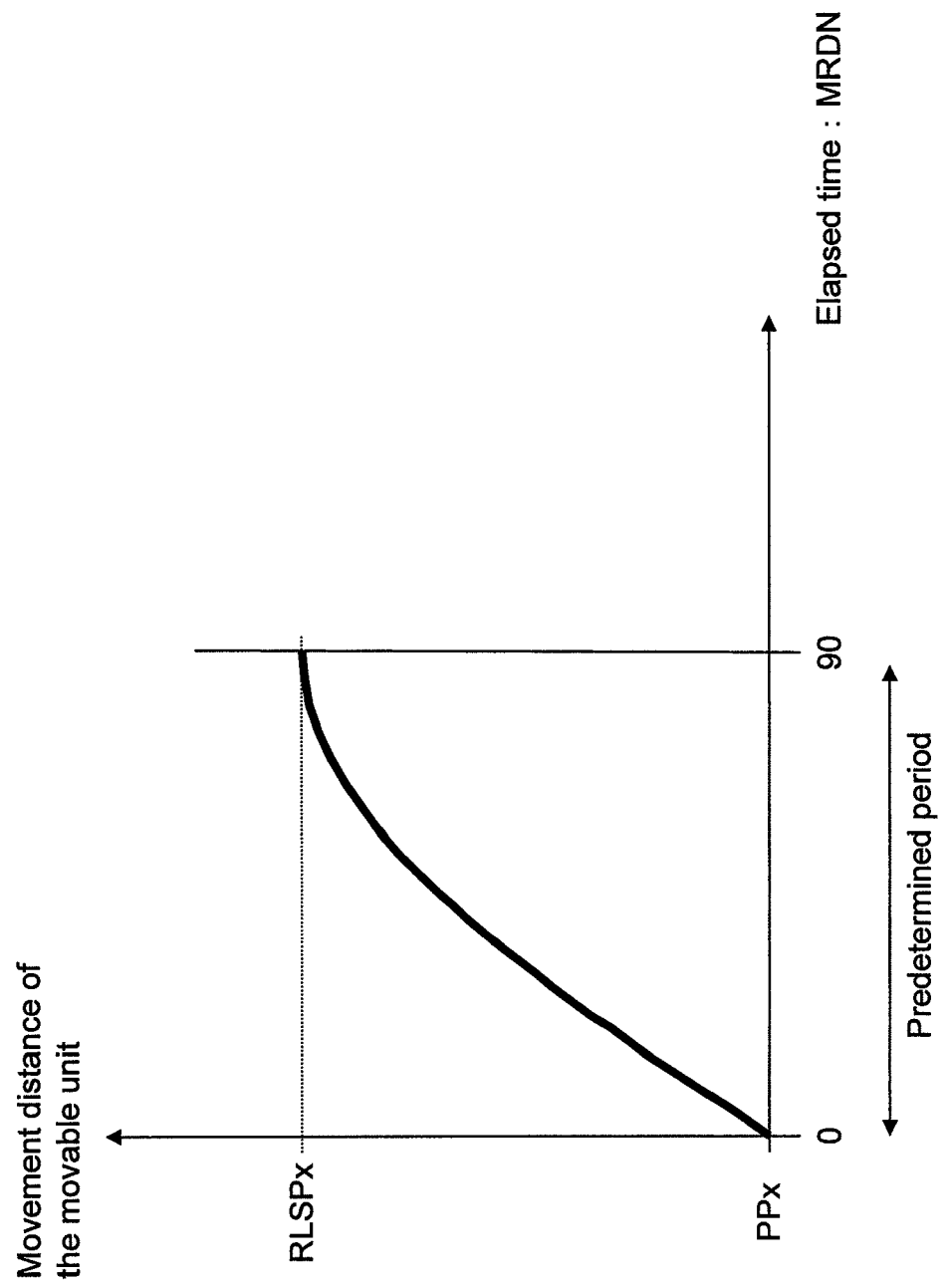
FIG. 7 is a graph that shows the relationship between a movement distance of the movable unit and a period of time beginning with the commencement of the movement of the movable unit in the first embodiment.

Specifically, the CPU 21 controls the movement of the movable unit 30*a*, under the condition where the relationship between a movement distance of the movable unit 30*a* and a period of time beginning with the commencement of the movement of the movable unit 30*a* is represented by a sine waveform (see FIG. 7), from the commencement of the movement of the movable unit 30*a* (MRDN=0, the elapsed time t=0) to the completion of the movement of the movable unit 30*a* (MRDN=90, the elapsed time t=90 ms).

In other words, the CPU 21 controls the movement of the movable unit 30*a*, under the condition where the relationship between the speed of movement of the movable unit 30*a* and the corresponding period of time is represented by a cosine waveform (see FIG. 8) from the commencement of the movement of the movable unit 30*a* (MRDN=0, the elapsed time t=0) to the completion of the movement of the movable unit 30*a* (MRDN=90, the elapsed time t=90 ms).

The first previous exposure position parameter RLSPx is set equal to the position of the movable unit 30*a* (the first position P1) in the first direction x at the point in time when the release switch 13*a* is set to the ON state and before the exposure time (see step S21 in FIG. 4).

Similarly, the second previous exposure position parameter RLSPy is set equal to the position of the movable unit 30*a* (the first position P1) in the second direction y at the point in time when the release switch 13*a* is set to the ON state and before the exposure time.

The first present position parameter PPx is set equal to the position of the movable unit 30*a* in the first direction x at the point in time corresponding to the commencement of the movement of the movable unit 30a to the first position P1 over the course of the predetermined length of time (90 ms) (see step S57 in FIG. 5).

Similarly, the second present position parameter PPy is set equal to the position of the movable unit 30a in the second direction y at the point in time corresponding to the commencement of the movement of the movable unit 30a to the first position P1 over the course of the predetermined length of time (90 ms).

Further, the CPU 21 stores values of a first digital angular velocity signal $Vx_n$, a second digital angular velocity signal $Vy_n$, a first digital angular velocity $VVx_n$, a second digital angular velocity $VVy_n$, a digital displacement angle $Bx_n$, a second digital displacement angle $By_n$, a coordinate of position $S_n$ in the first direction x: $Sx_n$, a coordinate of position $S_n$ in the second direction y: $Sy_n$, a first driving force $Dx_n$, a second driving force $Dy_n$, a coordinate of position $P_n$, after A/D conversion in the first direction x: $pdx_n$, a coordinate of position $P_n$ after A/D conversion in the second direction y: $pdy_n$, a first subtraction value $ex_n$, a second subtraction value $ey_n$, a first proportional coefficient Kx, a second proportional coefficient Ky, a sampling cycle θ of the anti-shake operation, a first integral coefficient Tix, a second integral coefficient Tiy, a first differential coefficient Tdx, and a second differential coefficient Tdy.

The AE unit (an exposure calculating unit) 23 performs the photometric operation and calculates the photometric values, based on the subject being photographed. The AE unit 23 also calculates the aperture value and the time length of the exposure, with respect to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The anti-shake part (the anti-shake apparatus) of the photographing apparatus 1 comprises an anti-shake button 14, an anti-shake switch 14a, an indicating unit 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is changed to the ON state so that the anti-shake operation, in which the angular velocity detection unit 25 and the anti-shake unit 30 are driven independently of the other operations which include the photometric operation etc., is carried out at the predetermined time interval. When the anti-shake switch 14a is in the ON state, in other words in the anti-shake mode, the anti-shake parameter IS is set to 1 (IS=1). When the anti-shake switch 14a is not in the ON state, in other words in the non-anti-shake mode, the anti-shake parameter IS is set to 0 (IS=0). In the first embodiment, the value of the predetermined time interval is set to 1 ms.

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. The information regarding whether the anti-shake switch 14a is in the ON state or OFF state is input to port P14 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The indicating unit 17 is connected to port P6 of the CPU 21 for inputting and outputting signals.

Next, the details of the input and output relationships between the CPU 21 and the angular velocity detection unit 25, the driver circuit 29, the anti-shake unit 30, and the hall-element signal-processing unit 45 are explained.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the second direction y (the velocity-component in the first direction x of the angular velocity of the photographing apparatus 1). The first angular velocity sensor 26a is a gyro sensor that detects a yawing angular velocity.

The second angular velocity sensor 26b detects the angular velocity of a rotary motion (the pitching) of the photographing apparatus 1 about the axis of the first direction x (detects the velocity-component in the second direction y of the angular velocity of the photographing apparatus 1). The second angular velocity sensor 26b is a gyro sensor that detects a pitching angular velocity.

The first high-pass filter circuit 27a reduces a low frequency component of the signal output from the first angular velocity sensor 26a, because the low frequency component of the signal output from the first angular velocity sensor 26a includes signal elements that are based on a null voltage and a panning-motion, neither of which are related to hand-shake.

The second high-pass filter circuit 27b reduces a low frequency component of the signal output from the second angular velocity sensor 26b, because the low frequency component of the signal output from the second angular velocity sensor 26b includes signal elements that are based on a null voltage and a panning-motion, neither of which are related to hand-shake.

The first amplifier 28a amplifies a signal regarding the yawing angular velocity, whose low frequency component has been reduced, and outputs the analog signal to the A/D converter A/D 0 of the CPU 21 as a first angular velocity vx.

The second amplifier 28b amplifies a signal regarding the pitching angular velocity, whose low frequency component has been reduced, and outputs the analog signal to the A/D converter A/D 1 of the CPU 21 as a second angular velocity vy.

The reduction of the low frequency signal component is a two-step process; the primary part of the analog high-pass filter processing operation is performed first by the first and second high-pass filter circuits 27a and 27b, followed by the secondary part of the digital high-pass filter processing operation that is performed by the CPU 21.

The cut off frequency of the secondary part of the digital high-pass filter processing operation is higher than that of the primary part of the analog high-pass filter processing operation.

In the digital high-pass filter processing operation, the value of a time constant (a first high-pass filter time constant hx and a second high-pass filter time constant hy) can be easily changed.

The supply of electric power to the CPU 21 and each part of the angular velocity detection unit 25 begins after the PON switch 11a is set to the ON state (the main power supply is set to the ON state). The calculation of a hand-shake quantity begins after the PON switch 11a is set to the ON state.

The CPU 21 converts the first angular velocity vx, which is input to the A/D converter A/D 0, to a first digital angular velocity signal $Vx_n$ (A/D conversion operation); calculates a first digital angular velocity $VVx_n$ by reducing a low frequency component of the first digital angular velocity signal $Vx_n$ (the digital high-pass filter processing operation) because the low frequency component of the first digital angular velocity signal $Vx_n$ includes signal elements that are based on a null voltage and a panning-motion, neither of which are related to hand-shake; and calculates a hand shake quantity (a hand shake displacement angle: a first digital displacement angle $Bx_n$) by integrating the first digital angular velocity $VVx_n$ (the integration processing operation).

Similarly the CPU 21 converts the second angular velocity vy, which is input to the A/D converter A/D 1, to a second digital angular velocity signal $Vy_n$ (A/D conversion operation); calculates a second digital angular velocity $VVy_n$ by reducing a low frequency component of the second digital angular velocity signal $Vy_n$ (the digital high-pass filter processing operation) because the low frequency component of the second digital angular velocity signal $Vy_n$ includes signal elements that are based on a null voltage and a panning-motion, neither of which are related to hand-shake; and calculates a hand shake quantity (a hand shake displacement angle: a second digital displacement angle $By_n$) by integrating the second digital angular velocity $VVy_n$ (the integration processing operation).

Accordingly, the CPU 21 and the angular velocity detection unit 25 use a function to calculate the hand-shake quantity.

"n" is an integer that is greater than 0, and indicates a length of time (ms) from the point when the interruption process of the timer commences, (t=0, and see step S12 in FIG. 4) to the point when the latest anti-shake operation is performed (t=n).

Figure 6:
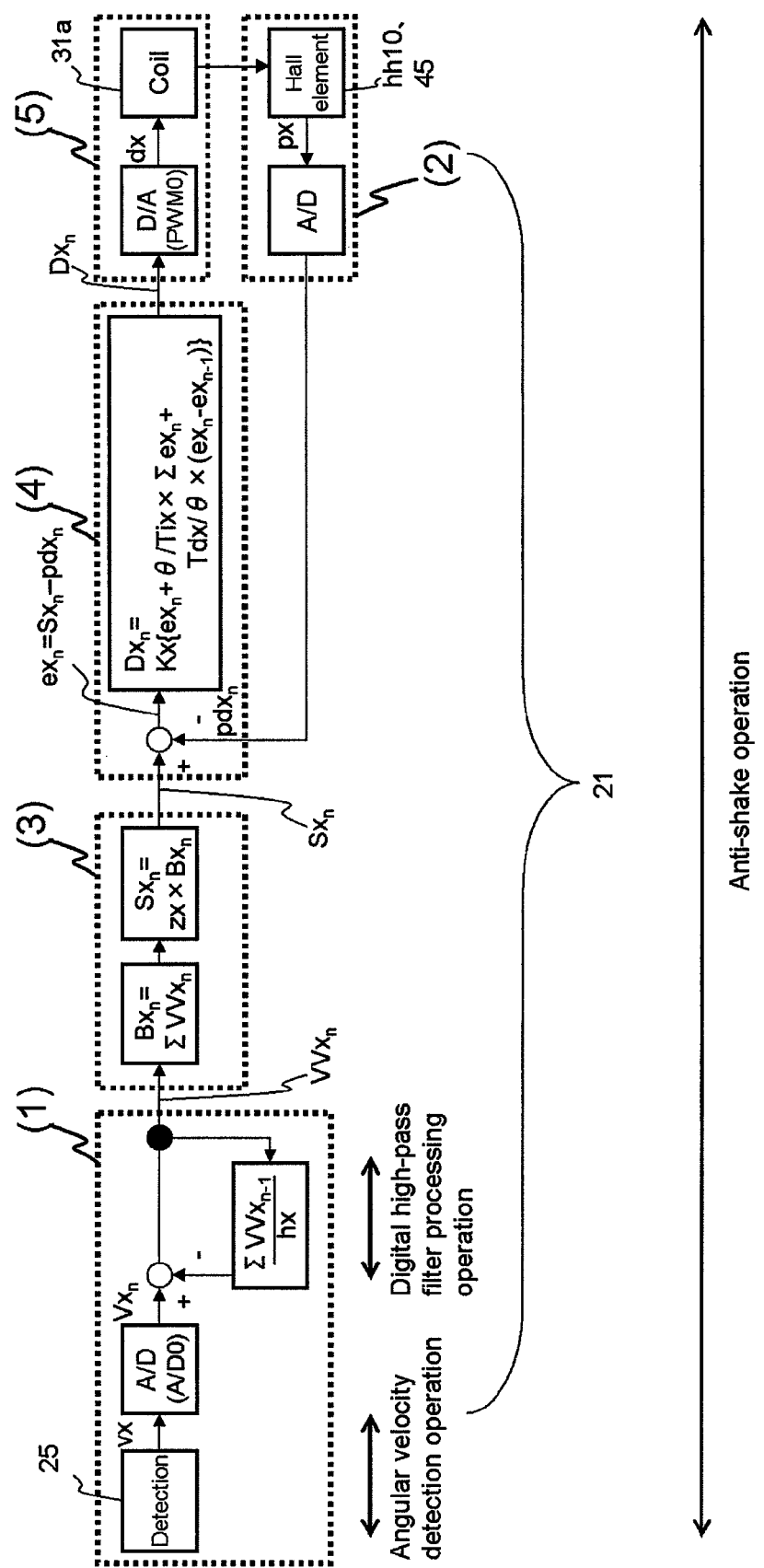
FIG. 6 is a figure that shows calculations in the anti-shake operation.

In the digital high-pass filter processing operation regarding the first direction x, the first digital angular velocity $VVx_n$ is calculated by dividing the summation of the first digital angular velocity $VVx_0$ to $VVx_{n-1}$ calculated by the interruption process of the timer before the 1 ms predetermined time interval (before the latest anti-shake operation is performed), by the first high-pass filter time constant hx, and then subtracting the resulting quotient from the first digital angular velocity signal $Vx_n$ ($VVx_n = Vx_n - (\Sigma VVx_{n-1}) \div hx$, see (1) in FIG. 6).

In the digital high-pass filter processing operation regarding the second direction y, the second digital angular velocity $VVy_n$ is calculated by dividing the summation of the second digital angular velocity $VVy_0$ to $VVy_{n-1}$ calculated by the interruption process of the timer before the 1 ms predetermined time interval (before the latest anti-shake operation is performed), by the second high-pass filter time constant hy, and then subtracting the resulting quotient from the second digital angular velocity signal $Vy_n$ ($VVy_n = Vy_n - (\Sigma VVy_{n-1}) \div hy$).

In the first embodiment, the angular velocity detection operation in (portion of) the interruption process of the timer includes a process in the angular velocity detection unit 25 and a process of inputting process of the first and second angular velocities vx and vy from the angular velocity detection unit 25 to the CPU 21.

In the integration processing operation regarding the first direction x, the first digital displacement angle $Bx_n$ is calculated by the summation from the first digital angular velocity $VVx_0$ at the point when the interruption process of the timer commences, t=0, (see step S12 in FIG. 4) to the first digital angular velocity $VVx_n$ at the point when the latest anti-shake operation is performed (t=n), ($Bx_n = \Sigma VVx_n$, see (3) in FIG. 6).

Similarly, in the integration processing operation regarding the second direction y, the second digital displacement angle $By_n$ is calculated by the summation from the second digital angular velocity $VVy_0$ at the point when the interruption process of the timer commences to the second digital angular velocity $VVy_n$ at the point when the latest anti-shake operation is performed ($By_n = \Sigma VVy_n$).

The CPU 21 calculates the position $S_n$ where the imaging unit 39a (the movable unit 30a) should be moved, corresponding to the hand-shake quantity (the first and second digital displacement angles $Bx_n$ and $By_n$) calculated for the first direction x and the second direction y, based on a position conversion coefficient zz (a first position conversion coefficient zx for the first direction x and a second position conversion coefficient zy for the second direction y).

The coordinate of position $S_n$ in the first direction x is defined as $Sx_n$, and the coordinate of position $S_n$ in the second direction y is defined as $Sy_n$. The movement of the movable unit 30a, which includes the imaging unit 39a, is performed by using electro-magnetic force and is described later.

The driving force $D_n$ drives the driver circuit 29 in order to move the movable unit 30a to the position $S_n$. The coordinate of the driving force $D_n$ in the first direction x is defined as the first driving force $Dx_n$ (after D/A conversion: a first PWM duty dx). The coordinate of the driving force $D_n$ in the second direction y is defined as the second driving force $Dy_n$ (after D/A conversion: a second PWM duty dy).

In the first embodiment, the position $S_n$ where the imaging unit 39a (the movable unit 30a) should be moved during the predetermined period having the predetermined length of time after the completion anti-shake operation, is not set to the value that corresponds to the hand-shake quantity, but is instead set to the value for moving the movable unit 30a to the first position P1 over the course of the predetermined period of time (see step S59 in FIG. 5).

In a positioning operation regarding the first direction x, the coordinate of position $S_n$ in the first direction x is defined as $Sx_n$, and is the product of the latest first digital displacement angle $Bx_n$ and the first position conversion coefficient zx ($Sx_n = zx \times Bx_n$, see (3) in FIG. 6).

In a positioning operation regarding the second direction y, the coordinate of position $S_n$ in the second direction y is defined as $Sy_n$, and is the product of the latest second digital displacement angle $By_n$ and the second position conversion coefficient zy ($Sy_n = zy \times By_n$).

The anti-shake unit 30 is an apparatus that corrects for the hand-shake effect by moving the imaging unit 39a to the position $S_n$, by canceling the lag of the photographing subject image on the imaging surface of the imaging device of the imaging unit 39a, and by stabilizing the photographing subject image displayed on the imaging surface of the imaging device, during the exposure time and when the anti-shake operation is performed (IS=1).

The anti-shake unit 30 has a fixed unit 30b, and a movable unit 30a which includes the imaging unit 39a and can be moved about on the xy plane.

During the exposure time when the anti-shake operation is not performed (IS=0), the movable unit 30a is fixed to (held at) a predetermined position. In the first embodiment, the predetermined position is at the center of the range of movement.

During the predetermined period following the time of exposure, the movable unit 30a is driven (moved) to the first position P1; otherwise (except for during the time of exposure and the predetermined period following the time of exposure), the movable unit 30a is not driven (moved).

The anti-shake unit 30 does not have a fixed-positioning mechanism that maintains the movable unit 30a in a fixed (held) position when the movable unit 30a is not being driven (drive OFF state).

The driving of the movable unit 30a of the anti-shake unit 30, including movement to a predetermined fixed (held) position, is performed by the electro-magnetic force of the coil unit for driving and the magnetic unit for driving, through the driver circuit 29 which has the first PWM duty dx input from the PWM 0 of the CPU 21 and has the second PWM duty dy input from the PWM 1 of the CPU 21 (see (5) in FIG. 6).

The detected-position $P_n$ of the movable unit 30a, either before or after the movement effected by the driver circuit 29, is detected by the hall element unit 44a and the hall-element signal-processing unit 45.

Information regarding the first coordinate of the detected-position $P_n$ in the first direction x, in other words a first detected-position signal px, is input to the A/D converter A/D 2 of the CPU 21 (see (2) in FIG. 6). The first detected-position signal px is an analog signal that is converted to a digital signal by the A/D converter A/D 2 (A/D conversion operation). The first coordinate of the detected-position $P_n$ in the first direction x, after the A/D conversion operation, is defined as $pdx_n$ and corresponds to the first detected-position signal px.

Information regarding the second coordinate of the detected-position $P_n$ in the second direction y, in other words a second detected-position signal py, is input to the A/D converter A/D 3 of the CPU 21. The second detected-position signal py is an analog signal that is converted to a digital signal by the A/D converter A/D 3 (A/D conversion operation). The second coordinate of the detected-position $P_n$ in the second direction y, after the A/D conversion operation, is defined as $pdy_n$ and corresponds to the second detected-position signal py.

The PID (Proportional Integral Differential) control calculates the first and second driving forces $Dx_n$ and $Dy_n$ on the basis of the coordinate data for the detected-position $P_n$ ($pdx_n$, $pdy_n$) and the position $S_n$ ($Sx_n$, $Sy_n$) following movement.

The calculation of the first driving force $Dx_n$ is based on the first subtraction value $ex_n$, the first proportional coefficient Kx, the sampling cycle θ, the first integral coefficient Tix, and the first differential coefficient Tdx ($Dx_n = Kx \times \{ex_n + \theta \div Tix \times \Sigma ex_n + Tdx \div \theta \times (ex_n - ex_{n-1})\}$, see (4) in FIG. 6). The first subtraction value $ex_n$ is calculated by subtracting the first coordinate of the detected-position $P_n$ in the first direction x after the A/D conversion operation, $pdx_n$, from the coordinate of position $S_n$ in the first direction x, $Sx_n$ ($ex_n = Sx_n - pdx_n$).

The calculation of the second driving force $Dy_n$ is based on the second subtraction value $ey_n$, the second proportional coefficient Ky, the sampling cycle θ, the second integral coefficient Tiy, and the second differential coefficient Tdy ($Dy_n = Ky \times \{ey_n + \theta \div Tiy \times \Sigma ey_n + Tdy \div \theta \times (ey_n - ey_{n-1})\}$). The second subtraction value $ey_n$ is calculated by subtracting the second coordinate of the detected-position $P_n$ in the second direction y after the A/D conversion operation, $pdy_n$, from the coordinate of position $S_n$ in the second direction y, $Sy_n$ ($ey_n = Sy_n - pdy_n$).

The value of the sampling cycle θ is set to a predetermined time interval of 1 ms.

Driving the movable unit 30a to the position $S_n$, ($Sx_n$, $Sy_n$) corresponding to the anti-shake operation of the PID control, is performed when the photographing apparatus 1 is in the anti-shake mode (IS=1) where the anti-shake switch 14a is set to the ON state.

When the anti-shake parameter IS is 0, the PID control that does not correspond to the anti-shake operation is performed so that the movable unit 30a is moved to the center of the range of movement (the predetermined position).

The movable unit 30a has a coil unit for driving that is comprised of a first driving coil 31a and a second driving coil 32a, an imaging unit 39a that has the imaging device, and a hall element unit 44a as a magnetic-field change-detecting element unit. In the first embodiment, the imaging device is a CCD; however, the imaging device may be another imaging device such as a CMOS etc.

The fixed unit 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed unit 30b movably supports the movable unit 30a in the first direction x and in the second direction y.

When the center area of the imaging device is intersected by the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device.

A rectangle shape, which is the form of the imaging surface of the imaging device, has two diagonal lines. In the first embodiment, the center of the imaging device is at the intersection of these two diagonal lines.

The first driving coil 31a, the second driving coil 32a, and the hall element unit 44a are attached to the movable unit 30a.

The first driving coil 31a forms a seat and a spiral shaped coil pattern. The coil pattern of the first driving coil 31a has lines which are parallel to the second direction y, thus creating the first electro-magnetic force to move the movable unit 30a that includes the first driving coil 31a, in the first direction x.

The first electro-magnetic force occurs on the basis of the current direction of the first driving coil 31a and the magnetic-field direction of the first position-detecting and driving magnet 411b.

The second driving coil 32a forms a seat and a spiral shaped coil pattern. The coil pattern of the second driving coil 32a has lines which are parallel to the first direction x, thus creating the second electro-magnetic force to move the movable unit 30a that includes the second driving coil 32a, in the second direction y.

The second electro-magnetic force occurs on the basis of the current direction of the second driving coil 32a and the magnetic-field direction of the second position-detecting and driving magnet 412b.

The first and second driving coils 31a and 32a are connected to the driver circuit 29, which drives the first and second driving coils 31a and 32a, through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a that corresponds to the value of the first PWM duty dx, and to the second driving coil 32a that corresponds to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the fixed unit 30b, on the side of the movable unit 30a, in the third direction z.

The second position-detecting and driving magnet 412b is attached to the second position-detecting and driving yoke 432b, under the condition where the N pole and S pole are arranged in the second direction y. The second position-detecting and driving yoke 432b is attached to the fixed unit 30b, on the side of the movable unit 30a, in the third direction z.

The first and second position-detecting and driving yokes 431b, 432b are made of a soft magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element unit 44a is a single-axis unit that contains two magnetoelectric converting elements (magnetic-field change-detecting elements) utilizing the Hall Effect to detect the first detected-position signal px and the second detected-position signal py specifying the first coordinate in the first direction x and the second coordinate in the second direction y, respectively, of the present position $P_n$ of the movable unit 30a.

One of the two hall elements is a horizontal hall element hh10 for detecting the first coordinate of the position $P_n$ of the movable unit 30a in the first direction x, and the other is a vertical hall element hv10 for detecting the second coordinate of the position $P_n$ of the movable unit 30a in the second direction y.

The horizontal hall element hh10 is attached to the movable unit 30a, where the horizontal hall element hh10 faces the first position-detecting and driving magnet 411b of the fixed unit 30b in the third direction z.

The vertical hall element hv10 is attached to the movable unit 30a, where the vertical hall element hv10 faces the second position-detecting and driving magnet 412b of the fixed unit 30b in the third direction z.

When the center of the imaging device intersects the optical axis LX, it is desirable to have the horizontal hall element hh10 positioned on the hall element unit 44a facing an intermediate area between the N pole and S pole of the first position-detecting and driving magnet 411b in the first direction x, as viewed from the third direction z. In this position, the horizontal hall element hh10 utilizes the maximum range in which an accurate position-detecting operation can be performed based on the linear output-change (linearity) of the single-axis hall element.

Similarly, when the center of the imaging device intersects the optical axis LX, it is desirable to have the vertical hall element hv10 positioned on the hall element unit 44a facing an intermediate area between the N pole and S pole of the second position-detecting and driving magnet 412b in the second direction y, as viewed from the third direction z.

The hall-element signal-processing unit 45 has a first hall-element signal-processing circuit 450 and a second hall-element signal-processing circuit 460.

The first hall-element signal-processing circuit 450 detects a horizontal potential-difference x10 between the output terminals of the horizontal hall element hh10 that is based on an output signal of the horizontal hall element hh10.

The first hall-element signal-processing circuit 450 outputs the first detected-position signal px, which specifies the first coordinate of the position $P_n$ of the movable unit 30a in the first direction x, to the A/D converter A/D 2 of the CPU 21, on the basis of the horizontal potential-difference x10.

The second hall-element signal-processing circuit 460 detects a vertical potential-difference y10 between the output terminals of the vertical hall element hv10 that is based on an output signal of the vertical hall element hv10.

The second hall-element signal-processing circuit 460 outputs the second detected-position signal py, which specifies the second coordinate of the position $P_n$ of the movable unit 30a in the second direction y, to the A/D converter A/D 3 of the CPU 21, on the basis of the vertical potential-difference y10.

Next, the main operation of the photographing apparatus 1 in the first embodiment is explained by using the flowchart in FIG. 4.

When the photographing apparatus 1 is set to the ON state, the electrical power is supplied to the angular velocity detection unit 25 so that the angular velocity detection unit 25 is set to the ON state in step S11.

In step S12, the interruption process of the timer at the predetermined time interval (1 ms) commences. In step S13, the value of the release state parameter RP is set to 0. The detail of the interruption process of the timer in the first embodiment is explained later by using the flowchart in FIG. 5.

In step S14, it is determined whether the photometric switch 12a is set to the ON state. When it is determined that the photometric switch 12a is not set to the ON state, the operation returns to step S14 and the process in step S14 is repeated. Otherwise, the operation continues on to step S15.

In step S15, it is determined whether the anti-shake switch 14a is set to the ON state. When it is determined that the anti-shake switch 14a is not set to the ON state, the value of the anti-shake parameter IS is set to 0 in step S16. Otherwise, the value of the anti-shake parameter IS is set to 1 in step S17.

In step S18, the AE sensor of the AE unit 23 is driven, the photometric operation is performed, and the aperture value and exposure time are calculated.

In step S19, the AF sensor and the lens control circuit of the AF unit 24 are driven to perform the AF sensing and focus operations, respectively.

In step S20, it is determined whether the release switch 13a is set to the ON state. When the release switch 13a is not set to the ON state, the operation returns to step S14 and the process in steps S14 to S19 is repeated. Otherwise, the operation continues on to step S21.

In step S21, the first position P1 is specified. Specifically, the value of the first previous exposure position parameter RLSPx is set to the value of the coordinate of the position $P_n$ after A/D conversion in the first direction x: $pdx_n$, the value of the second previous exposure position parameter RLSPy is set to the value of the coordinate of the position $P_n$ after A/D conversion in the second direction y: $pdy_n$, and then the release sequence operation commences.

In step S22, the value of the release state parameter RP is set to 1.

In step S23, the mirror-up operation and the aperture closing operation corresponding to the aperture value that is either preset or calculated, are performed by the mirror-aperture-shutter unit 18.

After the mirror-up operation is finished, the opening operation of the shutter (the movement of the front curtain in the shutter) commences in step S24.

In step S25, the exposure operation, or in other words the electric charge accumulation of the imaging device (CCD etc.), is performed. After the exposure time has elapsed, the value of the mirror state parameter MP is set to 1 and the value of the mirror-down time parameter MRDN is set to 0 in step S26.

In step S27, the closing operation of the shutter (the movement of the rear curtain in the shutter), the mirror-down operation, and the opening operation of the aperture are performed by the mirror-aperture-shutter unit 18. In step S28, the value of the mirror state parameter MP is set to 0.

After the time of exposure, the anti-shake operation is complete, and the movement of the movable unit 30*a* for the anti-shake operation is postponed until the release switch 13*a* is once again set to the ON state. In other words, the interruption process in FIG. 5 is performed without executing the actions of steps S61 to S63 from after the exposure time until the next time the release switch 13*a* is set to the ON state.

The elapsed time from commencement to completion of the mirror-down operation is approximately 120 ms. In the first embodiment, the movement of the movable unit 30*a* to the first position P1 is finished before (or at the same time of) the completion of the mirror-down operation.

Further, when the completion of the movement of the movable unit 30*a* to the first position P1 is synchronized with the completion of the mirror-down operation, the timing of the shock from the braking the movement of the movable unit 30*a* agrees with the timing of the shock based on the completion of the mirror-down operation. Therefore, discomfort that the operator of the photographing apparatus 1 feels can be restrained because the shock based on breaking the movement of the movable unit 30*a* is cancelled out.

In step S29, the electric charge which has accumulated in the imaging device during the exposure time is read. In step S30, the CPU 21 communicates with the DSP 19 so that the image processing operation is performed based on the electric charge read from the imaging device. The image, on which the image processing operation is performed, is stored to the memory in the photographing apparatus 1. In step S31, the image that is stored in the memory is displayed on the indicating unit 17. In step S32, the value of the release state parameter RP is set to 0 so that the release sequence operation is finished, and the operation then returns to step S14, in other words the photographing apparatus 1 is set to a state where the next imaging operation can be performed.

Next, the interruption process of the timer in the first embodiment, which commences in step S12 in FIG. 4 and is performed at every predetermined time interval (1 ms) independent of the other operations, is explained by using the flowchart in FIG. 5.

When the interruption process of the timer commences, the first angular velocity vx, which is output from the angular velocity detection unit 25, is input to the A/D converter A/D 0 of the CPU 21 and converted to the first digital angular velocity signal $Vx_n$, in step S51. The second angular velocity vy, which is also output from the angular velocity detection unit 25, is input to the A/D converter A/D 1 of the CPU 21 and converted to the second digital angular velocity signal $Vy_n$ (the angular velocity detection operation).

The low frequencies of the first and second digital angular velocity signals $Vx_n$ and $Vy_n$ are reduced in the digital high-pass filter processing operation (the first and second digital angular velocities $VVx_n$ and $VVy_n$).

In step S52, it is determined whether the value of the release state parameter RP is set to 1. When it is determined that the value of the release state parameter RP is not set to 1, driving the movable unit 30*a* is set to OFF state, or the anti-shake unit 30 is set to a state where the driving control of the movable unit 30*a* is not performed in step S53. Otherwise, the operation proceeds directly to step S54.

In step S54, the hall element unit 44*a* detects the position of the movable unit 30*a*, and the first and second detected-position signals px and py are calculated by the hall-element signal-processing unit 45. The first detected-position signal px is then input to the A/D converter A/D 2 of the CPU 21 and converted to a digital signal $pdx_n$, whereas the second detected-position signal py is input to the A/D converter A/D 3 of the CPU 21 and also converted to a digital signal $pdy_n$, both of which thus determine the present position $P_n$ ($pdx_n$, $pdy_n$) of the movable unit 30*a*.

In step S55, it is determined whether the value of the mirror state parameter MP is set to 1. When it is determined that the value of the mirror state parameter MP is not set to 1, the operation proceeds directly to step S70. Otherwise, the operation continues to step S56.

In step S56, it is determined whether the value of the mirror-down time parameter MRDN is set to 0.

When it is determined that the value of the mirror-down time parameter MRDN is set to 0, the value of the first present position parameter PPx is set to the value of the coordinate of the position $P_n$ in the first direction x after A/D conversion, $pdx_n$, and the value of the second present position parameter PPy is set to the value of the coordinate of the position $P_n$ in the second direction y after A/D conversion, $pdy_n$, in step S57. Then the operation continues to step S58. Otherwise, the operation proceeds directly to step S58.

In step S58, it is determined whether the value of the mirror-down time parameter MRDN is set to 90.

When it is determined that the value of the mirror-down time parameter MRDN is set to 90, the operation returns proceeds directly to step S53; otherwise, the operation continues to step S59.

In step S59, the position $S_n$ ($Sx_n$, $Sy_n$) where the movable unit 30*a* (the imaging unit 39*a*) should be moved is calculated on the basis of the first and second present position parameters PPx and PPy, the first and second previous exposure position parameter RLSPx and RLSPy, and the mirror-down time parameter MRDN ($Sx_n$=PPx+(RLSPx−PPx)×sin (MRDN×90 degrees÷90), $Sy_n$=PPy+(RLSPy−PPy)×sin (MRDN×90 degrees÷90)).

In step S60, the value of the mirror-down time parameter MRDN is increased by the value of 1, then the operation proceeds directly to step S64.

Because a large load is exerted upon the CPU 21 when it performs the trigonometric function processing operation to calculate the value of "sin(MRDN×90 degrees÷90)", it is desirable to store the values of the 91 different patterns of "sin(MRDN×90 degrees÷90)" from when the MRDN=0 to when MRDN=90 in order to increase the processing speed.

In step S70, it is determined whether the value of the mirror-down time parameter MRDN is set to 90. When it is determined that the value of the mirror-down time parameter MRDN is set to 90, the operation proceeds to step S53. Otherwise, the operation returns to step S61.

In step S61, it is determined whether the value of the anti-shake parameter IS is 0. When it is determined that the value of the anti-shake parameter IS is 0 (IS=0), in other words when the photographing apparatus is not in anti-shake mode, the position $S_n$ ($Sx_n$, $Sy_n$) where the movable unit 30a (the imaging unit 39a) should be moved is set at the center of the range of movement of the movable unit 30a, in step S62. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S63.

In step S64, the first driving force $Dx_n$ (the first PWM duty dx) and the second driving force $Dy_n$ (the second PWM duty dy) of the driving force D, which moves the movable unit 30a to the position $S_n$, are calculated on the basis of the position $S_n$ ($Sx_n$, $Sy_n$) that was determined in step S59, step S62 or step S63, and the present position $P_n$ ($pdx_n$, $pdy_n$).

In step S65, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $Sy_n$).

The process of steps S64 and S65 is an automatic control calculation that is used with the PID automatic control for performing general (normal) proportional, integral, and differential calculations.

In an anti-shake apparatus that does not have a fixed-positioning mechanism so that the movable unit 30a remains stationary when the movable unit 30a is not being driven, such as the first embodiment, when the movement of the movable unit 30a is set to the OFF state after the anti-shake operation, the movable unit 30a is allowed to move freely according to the force of gravity until it is stopped upon making contact with the end of its range of movement. In the case where the impact between the movable unit 30a and the contacting part is large, the contacting part may be broken and the operator of the photographing apparatus 1 may experience discomfort due to the shock of the movable unit 30a.

In the first embodiment, when the anti-shake operation is complete and the control driving the movable unit 30a is set to the OFF state, the movable unit 30a is moved to the first position P1 over the course of the predetermined length of time (90 ms). The first position P1 is determined based on the position in which the photographing apparatus 1 is held by the operator before the exposure time, so that the position of the photographing apparatus 1 held by the operator at the end of the time of exposure time (the completion of the anti-shake operation) is approximately the same as the position of the photographing apparatus 1 held by the operator before the time of exposure.

Therefore, the position where the movable unit is moved according to the force of gravity, upon completion of the anti-shake operation when the control driving the movable unit 30a is set to the OFF state, which is somewhere at the end of the range of movement, is almost the same as the first position P1.

Figure 8:
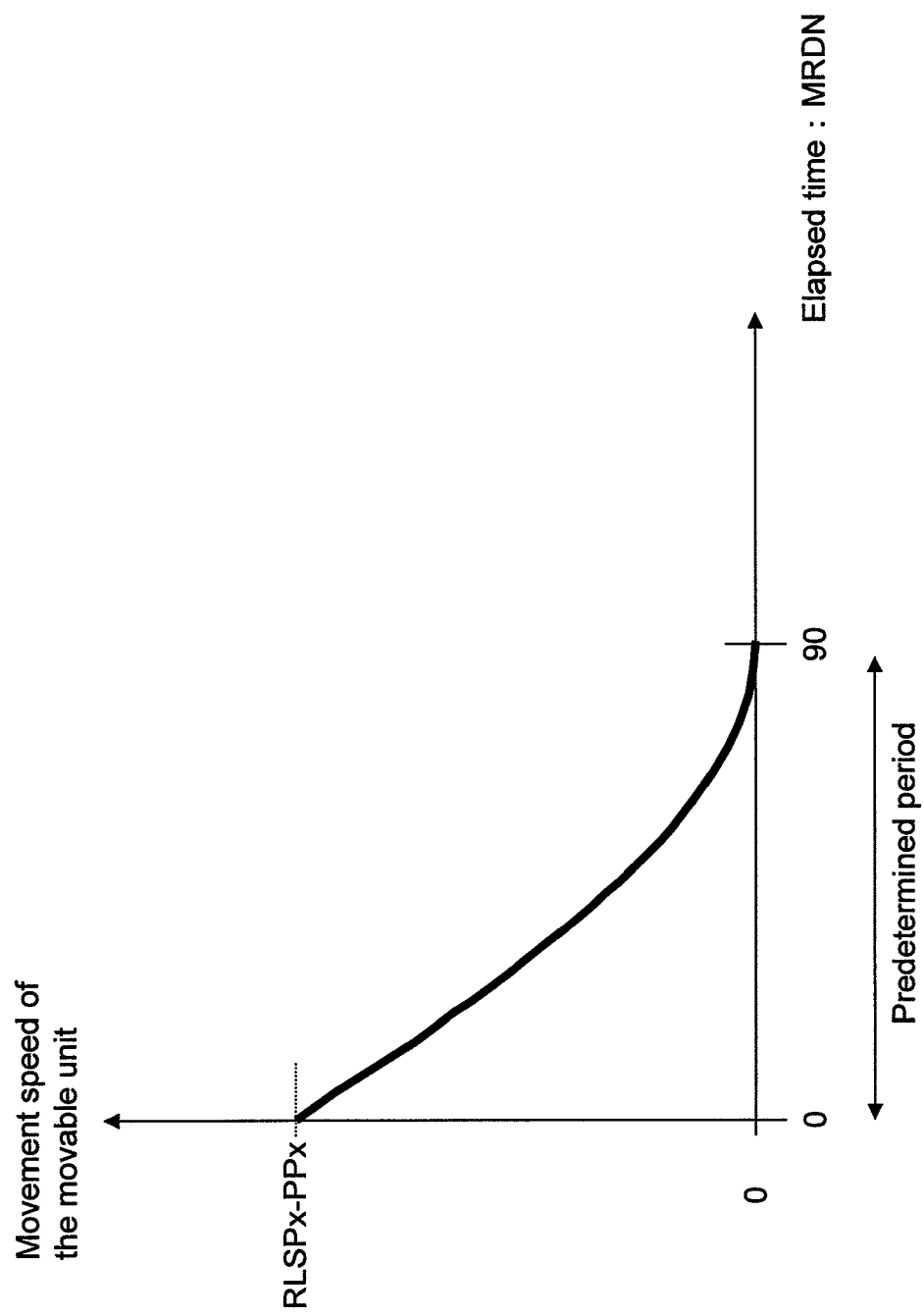
FIG. 8 is a graph that shows the relationship between a period of time and a movement speed of the movable unit in the first embodiment.

Further, the movement of the movable unit 30a to the first position P1 is performed over the course of the predetermined length of time (90 ms) at a comparatively low speed (see FIG. 8). Particularly towards the end of finishing the movement (when the movable unit 30a is near the first position P1), the movement of the movable unit 30a is performed at the low speed so that the shock based on the movement can be restrained.

Further, in the first embodiment, in order to move the movable unit 30a to the first position P1, it is not necessary to specify the direction of the movement. Therefore, the calculation can be simplified compared to the case where the direction of the movement of the movable unit 30a is specified by detecting the direction of gravity etc.

In the first embodiment, the CPU 21 controls the movement of the movable unit 30a, under the condition where the relationship between the movement distance of the movable unit 30a and a period of time beginning with the commencement of the movement of the movable unit 30a is represented by the sine waveform (see FIG. 7) from the commencement of the movement of the movable unit 30a (MRDN=0, the elapsed time t=0) to when the completion of the movement of the movable unit 30a (MRDN=90, the elapsed time t=90 ms), after the anti-shake operation.

In other words, the CPU 21 controls the movement of the movable unit 30a, under the condition where the relationship between the speed of the movement of the movable unit 30a and the corresponding period of time is represented by the cosine waveform (see FIG. 8) from the commencement of the movement of the movable unit 30a (MRDN=0, the elapsed time t=0) to the completion of the movement of the movable unit 30a (MRDN=90, the elapsed time t=90 ms), after the anti-shake operation.

The movement of the movable unit 30a to the first position P1 is performed based on the position detection operation of the movable unit 30a and the positioning operation in which the position to where the movable unit 30a should be moved is determined, at the predetermined time interval of 1 ms which is shorter than the predetermined period.

Therefore, the movement of the movable unit 30a can be decelerated smoothly and stably, so that the speed of the movable unit 30a is almost 0 when the movable unit 30a reaches the first position P1.

However, the waveform representing the relationship between the elapsed time and the movement distance of the movable unit 30a from the point when the movement of the movable unit 30a commences is not limited to the sine waveform.

For example, the waveform that represents the relationship between the movement distance of the movable unit 30a and the corresponding elapsed time from the point when the movement of the movable unit 30a commences, may be a saturation curve that the movement of the movable unit 30a follows at the low speed immediately before the completion of the movement of the movable unit 30a (MRDN=90).

Further, in the first embodiment, the photographing apparatus 1 is a single lens reflex camera that performs the mirror-up/down operation; however, the photographing apparatus 1 may not perform the mirror-up/down operation.

In the case where the photographing apparatus 1 that does not perform the mirror-up operation is used for the first embodiment, the movement of the movable unit 30a to the first position P1 commences after the anti-shake operation is finished, and the movement of the movable unit 30a to the first position P1 is complete before the secondary processing, such as the image processing operation etc., is complete.

Further, the length of the predetermined period is not limited 90 ms. The predetermined length of time is set to a time length that is shorter than the length of time from the point when the anti-shake operation is finished to the point when the mirror-down operation is finished (or to the point when the secondary processing, such as the image processing operation etc., is finished). Therefore, the predetermined length of time needs only to elapse (the predetermined period is completed) before the completion of the mirror-down operation (or the point in time when the secondary processing is finished).

In the first embodiment, the predetermined length of time is set to 90 ms, which is less than the length of time (approximately 120 ms) from the point when the mirror-down operation commences to the point when the mirror-down operation is finished (see step S27 in FIG. 4). Further, the elapse of the predetermined length of time (the predetermined period ends) occurs before (or at the same time of) the completion of the mirror-down operation (or the point when the secondary processing is finished).

Next, the second embodiment is explained. In the first embodiment, the movable unit 30a is moved to the first position P1, which is a position of the movable unit 30a immediately before the OFF state of the control driving the anti-shake operation, after the anti-shake operation. In the second embodiment, the movable unit 30a is moved to the second position that is calculated on the basis of the direction of the movement of the movable unit 30a according to the force of gravity, after the anti-shake operation. The points that differ from the first embodiment are explained as follows.

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation by the imaging unit 39a (the imaging apparatus) is performed, and the image which is captured, is stored.

In the second embodiment, the anti-shake operation is performed only when the release switch 13a is set to the ON state during the time of exposure. The movable unit 30a is moved to the second position P2 over the course of a second length of time after the exposure time for the imaging operation and a first period is finished.

The CPU 21 is a control apparatus that controls each part of the photographing apparatus 1 regarding the imaging operation, and the anti-shake operation (i.e. the image stabilizing operation). The anti-shake operation includes both the movement of the movable unit 30a and position-detection efforts.

Further, the CPU 21 stores a value of the anti-shake parameter IS that determines whether the photographing apparatus 1 is in the anti-shake mode or not, a value of a release state parameter RP, a value of a mirror state parameter MP, a value of a mirror-down time parameter MRDN, a value of a first end position parameter RFSPx, a value of a second end position parameter RFSPy, a value of a first present position parameter PPx, and a second present position parameter PPy.

The CPU 21 stops driving the movable unit 30a for the anti-shake operation, after the exposure time of the imaging operation (set to the OFF state). When the movement of the movable unit 30a for the anti-shake operation is stopped (set to the OFF state) and when another driving operation of the movable unit 30a is not performed, the movable unit 30a drops to the end of the range of movement according to the force of gravity (drop movement).

In the second embodiment, even after the movement of the movable unit 30a for the anti-shake operation has been set to the OFF state, the CPU 21 does not immediately drive the movable unit 30a. Instead, the CPU 21 pauses for a first length of time (30 ms) before driving the movable unit 30a over the course of (while taking the duration of) a second length of time (90 ms), based on a movement direction of the movable unit 30a in a first period that has the first length of time.

Specifically, after the value of the mirror state parameter MP is set to 1 and the first length of time has elapsed, the CPU 21 calculates a second position P2 based on the movement direction of the movable unit 30a in the first period. The movement direction of the movable unit 30a is determined on the basis of a quantity of change between the position of the movable unit 30a before the first length of time begins (immediately after the value of the mirror state parameter MP is set to 1) and the position of the movable unit 30a after the first length of time ends. Afterwards, the CPU 21 moves the movable unit 30a to the second position P2 over the course of a second length of time (90 ms).

In the movement of the movable unit 30a to the second position P2, the movable unit 30a moves at a low speed immediately before finishing its movement (when the movable unit 30a is approximately at the second position P2).

In other words, before finishing its movement, the movable unit 30a decelerates (slows down) then stops upon completion of the movement.

Specifically, the CPU 21 does not control the movement of the movable unit 30a in the first period, after the control for driving the movable unit 30a during the anti-shake operation is set to the OFF state.

Figure 11:
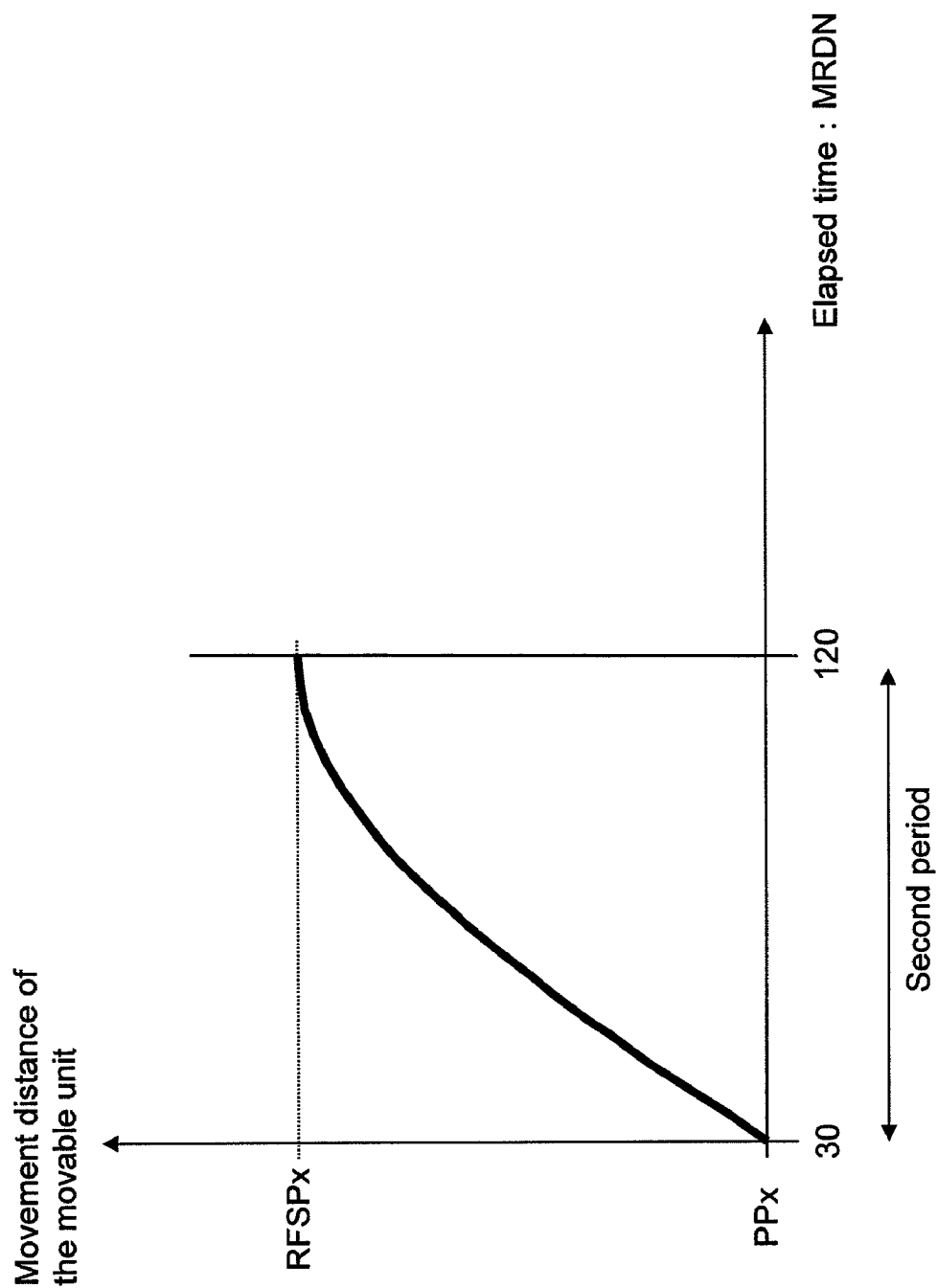
FIG. 11 is a graph that shows the relationship between a movement distance of the movable unit and a period of time beginning with the commencement of the movement of the movable unit in the second embodiment.

The CPU 21 resumes controlling the movement of the movable unit 30a under the condition where the relationship between the elapsed time and movement distance of the movable unit 30a is represented by a sine waveform (see FIG. 11). Specifically, under the control of the CPU 21, the movable unit 30a commences movement at the point in time signaling the end of the first length of time and the beginning of the second length of time (MRDN=30, the elapsed time t=30), and finishes movement at the point in time signaling the end of the second length of time (MRDN=120, the elapsed time t=120)

Figure 12:
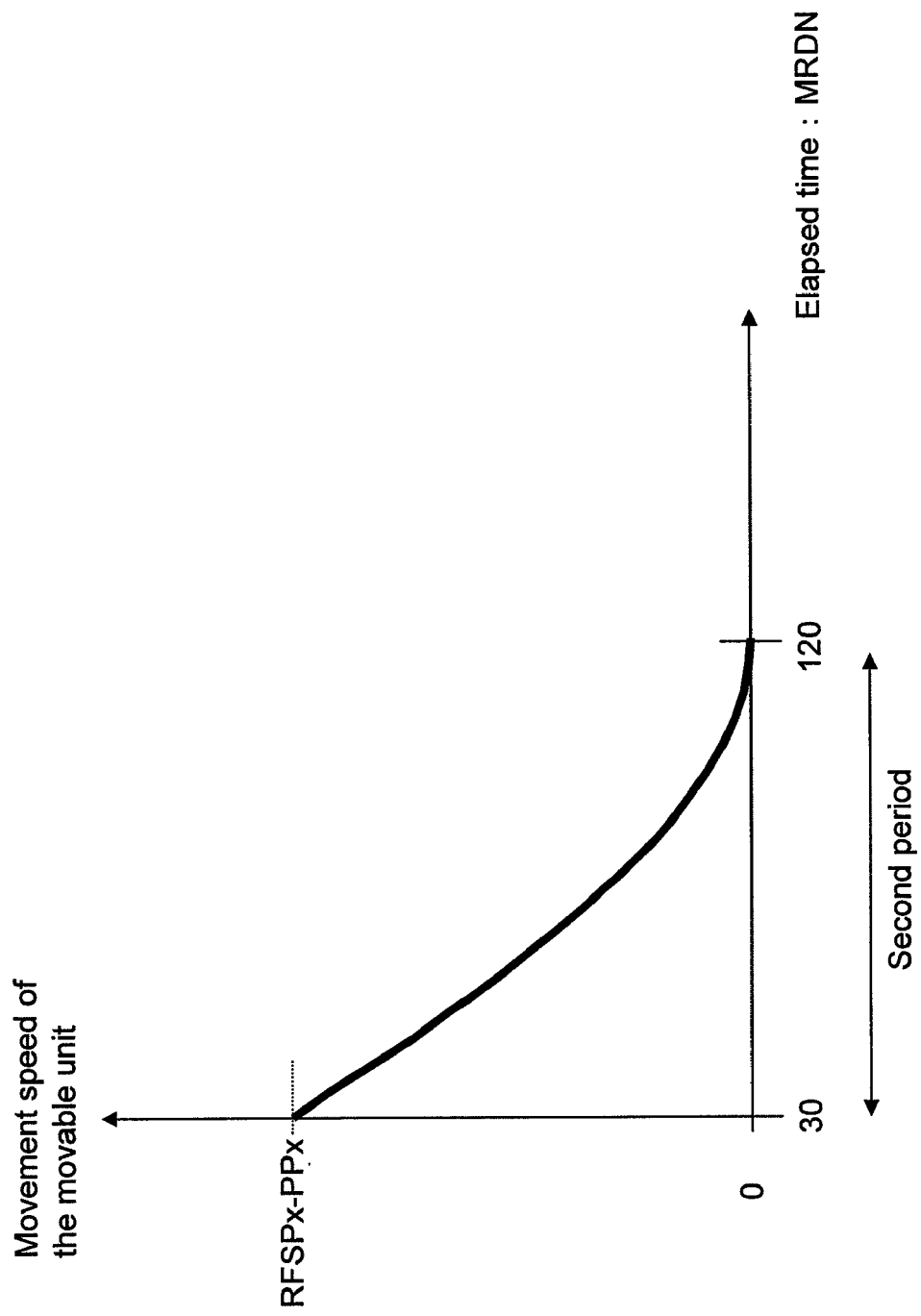
FIG. 12 is a graph that shows the relationship between a period of time and a movement speed of the movable unit in the second embodiment.

In other words, the CPU 21 resumes controlling the movement of the movable unit 30a under the condition where the relationship between the elapsed time and movement speed of the movable unit 30a is represented by a cosine waveform (see FIG. 12). Specifically, under the control of CPU 21, the movable unit 30a commences movement at the point in time signaling the end of the first length of time and the beginning of the second length of time (MRDN=30, the elapsed time t=30), and finishes movement at the point in time signaling the end of the second length of time (MRDN=120, the elapsed time t=120).

The first end position parameter RFSPx is set to the position of the movable unit 30a (the second position P2) in the first direction x.

Similarly, the second end position parameter RFSPy is set to the position of the movable unit 30a (the second position P2) in the second direction y.

The second position P2 is the calculated position where the movable unit 30a should be moved after the second length of time has elapsed, based on the movement direction of drop of the movable unit 30a in the first period according to force of gravity.

Figure 13:
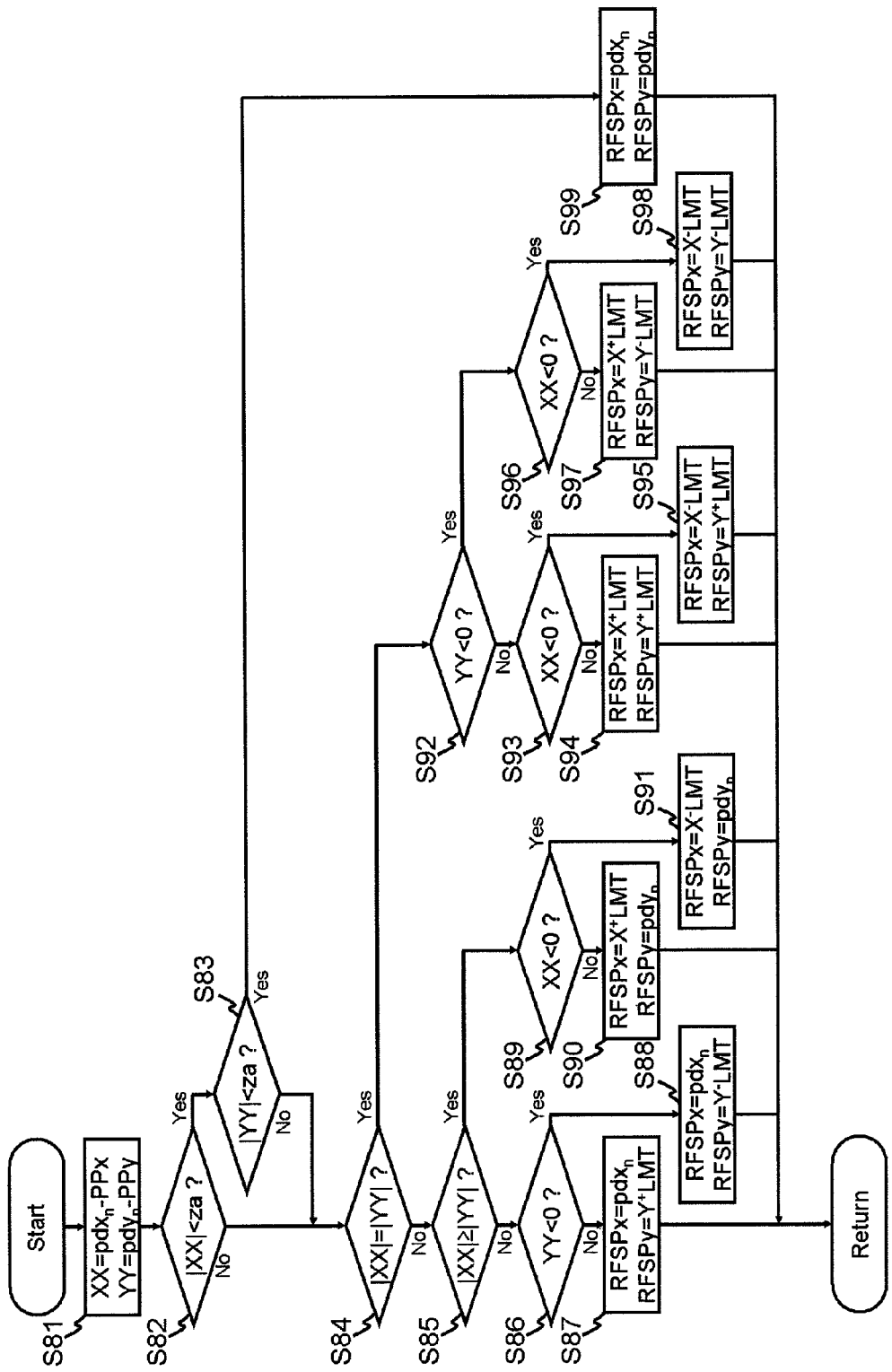
FIG. 13 is a flowchart that shows the detail of the calculation for specifying the second position in step S161 of FIG. 10 in the second embodiment.

In the case where the magnitude of the movement of the movable unit 30a in the first period according to the force of gravity is greater than or equal to the magnitude of a reference movement quantity ZA, the second position P2 is set to the end of the range of movement (see steps S87, S88, S90, S91, S94, S95, S97, and S98 in FIG. 13).

In the case where the magnitude of the movement of the movable unit 30a in the first period according to the force of gravity is not greater than and equal to the magnitude of the reference movement quantity ZA, such as when the photographing apparatus 1 faces towards the up side or down side etc., the second position P2 is set to same the position as that occupied by the movable unit 30a at the end of the first length of time (see step S99 in FIG. 13).

The CPU 21 stores the value of a first movement quantity parameter XX and the value of a second movement quantity parameter YY.

The first movement quantity parameter XX is set equal to the difference between the value of the coordinate of position $P_n$ after A/D conversion in the first direction x: $pdx_n$ and the value of the first present position parameter PPx (see step S81 in FIG. 13).

Similarly, the second movement quantity parameter YY is set equal to the difference between the value of the coordinate of position $P_n$ after A/D conversion in the second direction y: $pdy_n$ and the value of the second present position parameter PPy.

Figure 10:
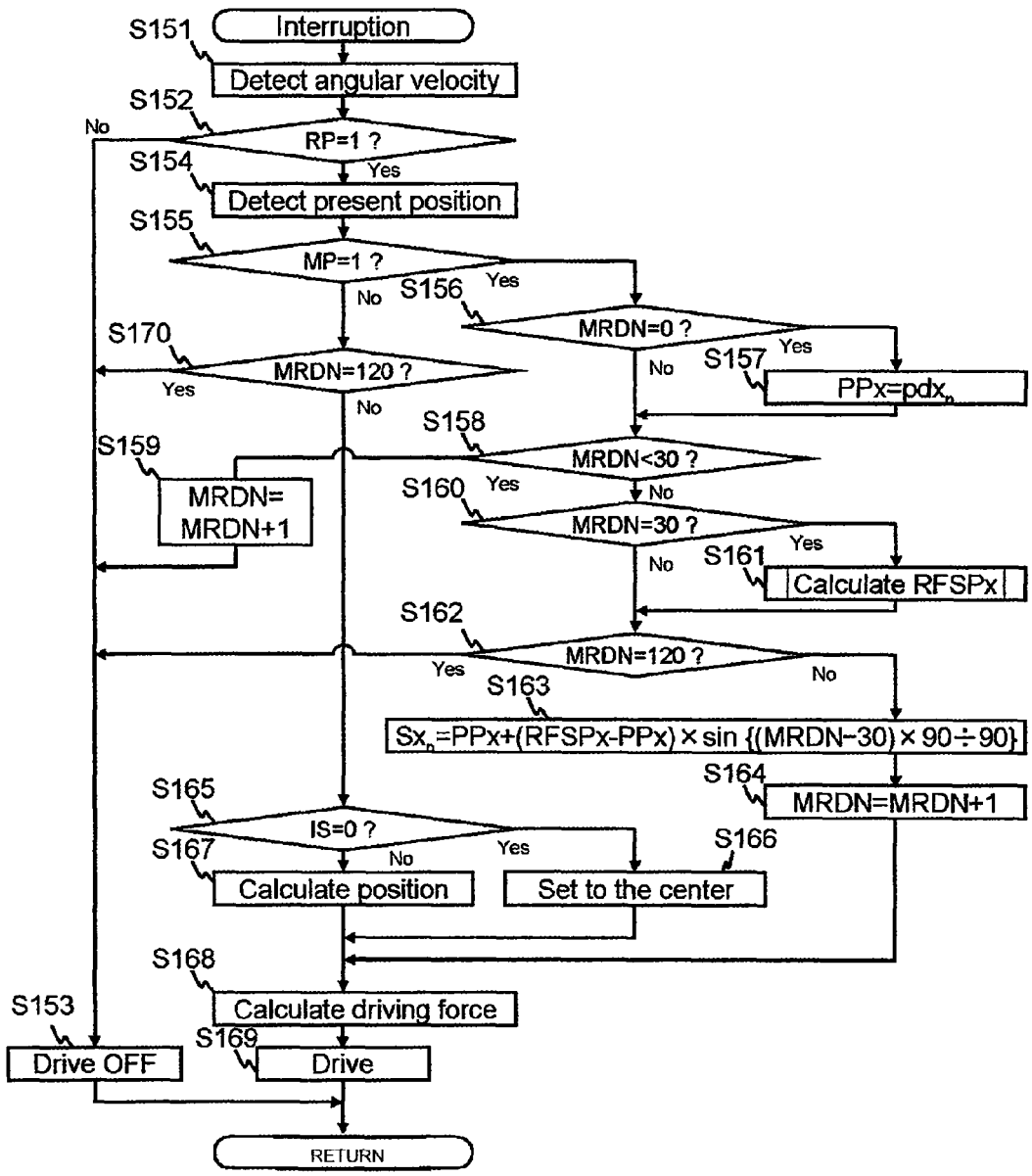
FIG. 10 is a flowchart that shows the detail of the interruption process of the timer in the second embodiment.

The first present position parameter PPx is set equal to the position occupied by the movable unit 30a in the first direction x at the completion of the anti-shake operation (see step S157 in FIG. 10).

Similarly, the second present position parameter PPy is set equal to the position occupied by the movable unit 30a in the second direction y at the completion of the anti-shake operation.

The value of the reference movement quantity ZA, the value of the first horizontal end position $X^+LMT$, the value of the second horizontal end position $X^-LMT$, the value of the first vertical end position $Y^+LMT$, and the value of the second vertical end position $Y^-LMT$, which are used for calculating the second position, are stored in the CPU 21 etc.

In the second embodiment, the position $S_n$ where the imaging unit 39a (the movable unit 30a) should be moved during a second period that has the second length of time after the anti-shake operation is complete and a first period that has the first length of time has elapsed, is set with respect to the movement of the movable unit 30a to the second position P2 during the second period, and does not correspond to the magnitude of hand-shake (see step S163 in FIG. 10).

Figure 9:
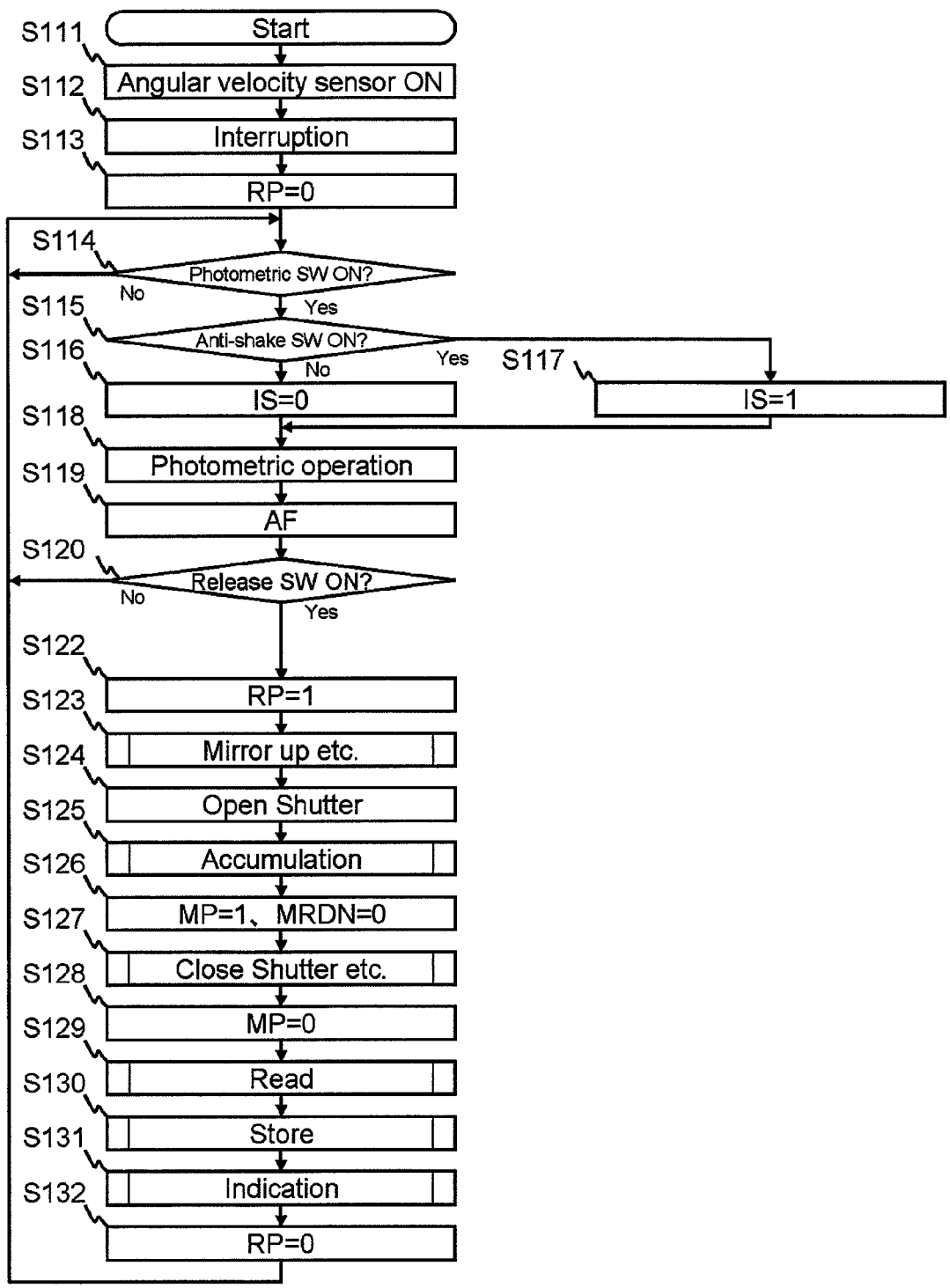
FIG. 9 is a flowchart that shows the main operation of the photographing apparatus in the second embodiment.

Next, the main operation of the photographing apparatus 1 in the second embodiment is explained by using the flowchart in FIG. 9.

When the photographing apparatus 1 is set to the ON state, the electrical power is supplied to the angular velocity detection unit 25 so that the angular velocity detection unit 25 is set to the ON state in step S111.

In step S112, the interruption process of the timer at the predetermined time interval (1 ms) commences. In step S113, the value of the release state parameter RP is set to 0. The detail of the interruption process of the timer in the second embodiment is explained later by using the flowchart in FIG. 10.

In step S114, it is determined whether the photometric switch 12a is set to the ON state. When it is determined that the photometric switch 12a is not set to the ON state, the operation returns to step S114 and the process in step S114 is repeated. Otherwise, the operation continues on to step S115.

In step S115, it is determined whether the anti-shake switch 14a is set to the ON state. When it is determined that the anti-shake switch 14a is not set to the ON state, the value of the anti-shake parameter IS is set to 0 in step S116. Otherwise, the value of the anti-shake parameter IS is set to 1 in step S117.

In step S118, the AE sensor of the AE unit 23 is driven, the photometric operation is performed, and the aperture value and exposure time are calculated.

In step S119, the AF sensor and the lens control circuit of the AF unit 24 are driven to perform the AF sensing and focus operations, respectively.

In step S120, it is determined whether the release switch 13a is set to the ON state. When the release switch 13a is not set to the ON state, the operation returns to step S114 and the process in steps S114 to S119 is repeated. Otherwise, the operation continues on to step S122, and the release sequence operation commences.

In step S122, the value of the release state parameter RP is set to 1.

In step S123, the mirror-up operation and the aperture closing operation corresponding to the aperture value that is either preset or calculated, are performed by the mirror-aperture-shutter unit 18.

After the mirror-up operation is finished, the opening operation of the shutter (the movement of the front curtain in the shutter) commences in step S124.

In step S125, the exposure operation, or in other words the electric charge accumulation of the imaging device (CCD etc.), is performed. After the exposure time has elapsed, the value of the mirror state parameter MP is set to 1 and the value of the mirror-down time parameter MRDN is set to 0 in step S126.

In step S127, the closing operation of the shutter (the movement of the rear curtain in the shutter), the mirror-down operation, and the opening operation of the aperture are performed by the mirror-aperture-shutter unit 18. In step S128, the value of the mirror state parameter MP is set to 0.

After the time of exposure, the anti-shake operation is complete, and the movement of the movable unit 30a for the anti-shake operation is postponed until the release switch 13a is once again set to the ON state. In other words, the interruption process in FIG. 10 is performed without executing the actions of steps S165 to S167 from after the exposure time and until the next time the release switch 13a is set to the ON state.

The elapsed time from commencement to completion of the mirror-down operation is approximately 120 ms. In the second embodiment, the movement of the movable unit 30a to the second position P2 (RFSPx, RFSPy) is finished before (or at the same time of) the completion of the mirror-down operation.

Further, when the completion of the movement of the movable unit 30a to the second position P2 is synchronized with the completion of the mirror-down operation, the timing of the shock from the braking of the movement of the movable unit 30a agrees with the timing of the shock based on the completion of the mirror-down operation. Therefore, discomfort that the operator of the photographing apparatus 1 feels can be restrained because the shock based on the breaking of the movement of the movable unit 30a is cancelled out.

In step S129, the electric charge which has accumulated in the imaging device during the exposure time is read. In step S130, the CPU 21 communicates with the DSP 19 so that the image processing operation is performed based on the electric charge read from the imaging device. The image, on which the image processing operation is performed, is stored to the memory in the photographing apparatus 1. In step S131, the image that is stored in the memory is displayed on the indicating unit 17. In step S132, the value of the release state parameter RP is set to 0 so that the release sequence operation is finished, and the operation then returns to step S14, in other words the photographing apparatus 1 is set to a state where the next imaging operation can be performed.

Next, the interruption process of the timer in the second embodiment, which commences in step S112 in FIG. 9 and is performed at every predetermined time interval (1 ms) independent of the other operations, is explained by using the flowchart in FIG. 10.

When the interruption process of the timer commences, the first angular velocity vx, which is output from the angular velocity detection unit 25, is input to the A/D converter A/D 0 of the CPU 21 and converted to the first digital angular velocity signal $Vx_n$, in step S151. The second angular velocity vy, which is also output from the angular velocity detection unit 25, is input to the A/D converter A/D 1 of the CPU 21 and converted to the second digital angular velocity signal $Vy_n$ (the angular velocity detection operation).

The low frequencies of the first and second digital angular velocity signals $Vx_n$ and $Vy_n$ are reduced in the digital high-pass filter processing operation (the first and second digital angular velocities $VVx_n$ and $VVy_n$).

In step S152, it is determined whether the value of the release state parameter RP is set to 1. When it is determined that the value of the release state parameter RP is not set to 1, driving the movable unit 30a is set to OFF state, or the anti-shake unit 30 is set to a state where the driving control of the movable unit 30a is not performed in step S153. Otherwise, the operation proceeds directly to step S154.

In step S154, the hall element unit 44a detects the position of the movable unit 30a, and the first and second detected-position signals px and py are calculated by the hall-element signal-processing unit 45. The first detected-position signal px is then input to the A/D converter A/D 2 of the CPU 21 and converted to a digital signal $pdx_n$, whereas the second detected-position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S155, it is determined whether the value of the mirror state parameter MP is set to 1. When it is determined that the value of the mirror state parameter MP is not set to 1, the operation proceeds directly to step S170. Otherwise, the operation continues to step S156.

In step S156, it is determined whether the value of the mirror-down time parameter MRDN is set to 0.

When it is determined that the value of the mirror-down time parameter MRDN is set to 0, the value of the first present position parameter PPx is set to the value of the coordinate of the position $P_n$ in the first direction x after A/D conversion, $pdx_n$, and the value of the second present position parameter PPy is set to the value of the coordinate of the position $P_n$ in the second direction y after A/D conversion, $pdy_n$ in step S157. Then the operation continues to step S158. Otherwise, the operation proceeds directly to step S158.

In step S158, it is determined whether the value of the mirror-down time parameter MRDN is set to a value less than 30. When it is determined that the value of the mirror-down time parameter MRDN is set to a value less than 30, the operation continues to step S159. Otherwise, the operation proceeds directly to step S160.

In step S159, the value of the mirror-down time parameter MRDN is increased by the value of 1. And then, the operation proceeds to step S153.

In step S160, it is determined whether the value of the mirror-down time parameter MRDN is set equal to 30.

When it is determined that the value of the mirror-down time parameter MRDN is set equal to 30 (i.e. the first length of time has elapsed), the operation continues to step S161. Otherwise, the operation proceeds directly to step S162.

In step S161, the calculation of the second position (RFSPx, RFSPy), the position where the movable unit 30a is moved over the course of the second length of time, is carried out. The detail of the calculation in step S161 is explained later by using the flowchart in FIG. 13.

In step S162, it is determined whether the value of the mirror-down time parameter MRDN is set to 120.

When it is determined that the value of the mirror-down time parameter MRDN is set to 120 (i.e. the first length of time has elapsed), the operation proceeds to step S153. Otherwise, the operation continues to step S163.

In step S163, the position $S_n$ ($Sx_n$, $Sy_n$) where the movable unit 30a (the imaging unit 39a) should be moved, is calculated on the basis of the first and second present position parameters PPx and PPy, the first and second end position parameters RFSPx and RFSPy, and the mirror-down time parameter MRDN ($Sx_n$=PPx+(RFSPx−PPx)×sin {(MRDN−30)×90 degrees÷90}, $Sy_n$=PPy+(RFSPy−PPy)×sin {(MRDN−30)×90 degrees÷90}).

In step S164, the value of the mirror-down time parameter MRDN is increased by the value of 1, then the operation proceeds directly to step S168.

Because a large load is exerted upon the CPU 21 when it performs the trigonometric function processing operation to calculate the value of "sin {(MRDN−30)×90 degrees÷90}", it is desirable to store the values of the 91 different patterns of "sin {(MRDN−1)×90 degrees÷90}" from when the MRDN=30, to when MRDN=120 in order to increase the processing speed.

In step S170, it is determined whether the value of the mirror-down time parameter MRDN is set to 120. When it is determined that the value of the mirror-down time parameter MRDN is set to 120, the operation proceeds to step S153. Otherwise, the operation proceeds to step S165.

In step S165, it is determined whether the value of the anti-shake parameter IS is 0. When it is determined that the value of the anti-shake parameter IS is 0 (IS=0), in other words when the photographing apparatus is not in anti-shake mode, the position $S_n$ ($Sx_n$, $Sy_n$) where the movable unit 30a (the imaging unit 39a) should be moved is set at the center of the range of movement of the movable unit 30a, in step S166. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S167.

In step S168, the first driving force $Dx_n$ (the first PWM duty dx) and the second driving force $Dy_n$ (the second PWM duty dy) of the driving force $D_n$, which moves the movable unit 30a to the position $S_n$, are calculated on the basis of the position $S_n$ ($Sx_n$, $Sy_n$) that was determined in step S163, step S166 or step S167, and the present position $P_n$ ($pdx_n$, $pdy_n$).

In step S169, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $Sy_n$).

The process of steps S168 and S169 is an automatic control calculation that is used with the PID automatic control for performing general (normal) proportional, integral, and differential calculations.

Next, the detail of the calculation for specifying the second position P2 in step S161 in FIG. 10 is explained by using the flowchart in FIG. 13.

In the flowchart of FIG. 13, the process for the calculation of the second position in the case where the range of movement of the movable unit 30a forms the shape of a square is explained. It should be noted that the range of movement of the movable unit 30a may also form a rectangular shape. In the case where the range of movement of the movable unit 30a forms a rectangular shape, the values of the conditions in each step of FIG. 13 are changed corresponding to the length to width ratio of the rectangular shape.

When the calculation of the second position P2 commences, the value of the first movement quantity parameter XX is calculated based on the coordinate of position $P_n$ after A/D conversion in the first direction x: $pdx_n$, at the end of the first period (at the end of the first length of time following the anti-shake operation), and the first present position parameter PPx (XX=$pdx_n$−PPx). Similarly, the value of the second movement quantity parameter YY is calculated based on the coordinate of position $P_n$ after A/D conversion in the second direction y: $pdy_n$, at the end of the first period (at the end of the first length of time following the anti-shake operation), and the second present position parameter PPy (YY=$pdy_n$−PPy), in step S81.

In step S82, it is determined whether the absolute value of the first movement quantity parameter XX is less than the reference movement quantity ZA.

When it is determined that the absolute value of the first movement quantity parameter XX is less than the reference movement quantity ZA, it is determined that the absolute value of the second movement quantity parameter YY is less than the reference movement quantity ZA in step S83.

When it is determined that the absolute value of the first movement quantity parameter XX is not less than the reference movement quantity ZA, the operation proceeds directly to step S84.

When it is determined that the absolute value of the second movement quantity parameter YY is less than the reference movement quantity ZA, the operation proceeds directly to step S99.

When it is determined that the absolute value of the second movement quantity parameter YY is not less than the reference movement quantity ZA, the operation continues to step S84.

In step S84, it is determined whether the absolute value of the first movement quantity parameter XX is equal to the absolute value of the second movement quantity parameter YY.

When it is determined that the absolute value of the first movement quantity parameter XX is equal to the absolute value of the second movement quantity parameter YY, the operation proceeds directly to step S92.

When it is determined that the absolute value of the first movement quantity parameter XX is not equal to the absolute value of the second movement quantity parameter YY, the operation continues to step S85.

In step S85, it is determined whether the absolute value of the first movement quantity parameter XX is greater than the absolute value of the second movement quantity parameter YY.

When it is determined that the absolute value of the first movement quantity parameter XX is greater than the absolute value of the second movement quantity parameter YY, the operation proceeds directly to step S89.

When it is determined that the absolute value of the first movement quantity parameter XX is not greater than the absolute value of the second movement quantity parameter YY, the operation continues to step S86.

In step S86, it is determined whether the value of the second movement quantity parameter YY is less than 0. When it is determined that the value of the second movement quantity parameter YY is less than 0, the operation proceeds directly to step S88. When it is determined that the value of the second movement quantity parameter YY is not less than 0, the operation continues to step S87.

In step S87, the value of the first end position parameter RFSPx is set equal to the value of the coordinate of position $P_n$ after A/D conversion in the first direction x: $pdx_n$ at the end of the first period (at the end of the first length of time following the completion of the anti-shake operation), and the value of the second end position parameter RFSPy is set equal to the value of the first vertical end position Y$^+$LMT.

In other words, the coordinate of the second position P2 in the first direction x is set equal to the value of the coordinate of the position in the first direction x at the point in time when the first period is complete (after the first length of time has elapsed following completion of the anti-shake operation), and the coordinate of the second position P2 in the second direction y is set equal to the value of the coordinate of the position in the second direction y at the end of the range of movement on the side where the movable unit 30a is moved in the first period.

In step S88, the value of the first end position parameter RFSPx is set equal to the value of the coordinate of position $P_n$ after A/D conversion in the first direction x: $pdx_n$ at the end of the first period (at the end of the first length of time following the completion of the anti-shake operation), and the value of the second end position parameter RFSPy is set equal to the value of the second vertical end position Y$^-$LMT.

In other words, the coordinate of the second position P2 in the first direction x is set equal to the value of the coordinate of the position in the first direction x at the point in time when the first period is complete (after the first length of time has elapsed following the completion of the anti-shake operation), and the coordinate of the second position P2 in the second direction y is set equal to the value of the coordinate of the position in the second direction y at the end of the range of movement on the side where the movable unit 30a is moved in the first period.

In step S89, it is determined whether the value of the first movement quantity parameter XX is less than 0. When it is determined that the value of the first movement quantity parameter XX is less than 0, the operation proceeds directly to step S91. When it is determined that the value of the first movement quantity parameter XX is not less than 0, the operation continues to step S90.

In step S90, the value of the first end position parameter RFSPx is set to the value of the first horizontal end position X$^+$LMT, and the value of the second end position parameter RFSPy is set to the value of the coordinate of position $P_n$ after A/D conversion in the second direction y: $pdy_n$ at the end of the first period (at the end of the first length of time following the completion of the anti-shake operation).

In other words, the coordinate of the second position P2 in the first direction x is set equal to the value of the coordinate of the position in the first direction x at the end of the range of movement on the side where the movable unit 30a is moved in the first period, and the coordinate of the second position P2 in the second direction y is set equal to the value of the coordinate of the position in the second direction y at the point in time when the first period is complete (after the first length of time has elapsed following the completion of the anti-shake operation).

In step S91, the value of the first end position parameter RFSPx is set equal to the value of the second horizontal end position X$^-$LMT, and the value of the second end position parameter RFSPy is set equal to the value of the coordinate of position $P_n$ after A/D conversion in the second direction y: $pdy_n$ at the end of the first period (at the end of the first length of time following the completion of the anti-shake operation).

In other words, the coordinate of the second position P2 in the first direction x is set equal to the value of the coordinate of the position in the first direction x at the end of the range of movement on the side where the movable unit 30a is moved in the first period, and the coordinate of the second position P2 in the second direction y is set equal to the value of the coordinate of the position in the second direction y at the point in time when the first period is complete (after the first length of time has elapsed following the completion of the anti-shake operation).

In step S92, it is determined whether the value of the second movement quantity parameter YY is less than 0. When it is determined that the value of the second movement quantity parameter YY is less than 0, the operation proceeds directly to step S96. When it is determined that the value of the second movement quantity parameter YY is not less than 0, the operation continues to step S93.

In step S93, it is determined whether the value of the first movement quantity parameter XX is less than 0. When it is determined that the value of the first movement quantity parameter XX is less than 0, the operation proceeds directly to step S95. When it is determined that the value of the first movement quantity parameter XX is not less than 0, the operation continues to step S94.

In step S94, the value of the first end position parameter RFSPx is set equal to the value of the first horizontal end position $X^+LMT$, and the value of the second end position parameter RFSPy is set equal to the value of the first vertical end position $Y^+LMT$.

In other words, the coordinate of the second position P2 in the first direction x is set equal to the value of the coordinate of the position in the first direction x at the end of the range of movement on the side where the movable unit 30a is moved in the first period, and the coordinate of the second position P2 in the second direction y is set equal to the value of the coordinate of the position in the second direction y at the end of the range of movement on the side where the movable unit 30a is moved in the first period.

In step S95, the value of the first end position parameter RFSPx is set equal to the value of the second horizontal end position $X^-LMT$, and the value of the second end position parameter RFSPy is set equal to the value of the first vertical end position $Y^+LMT$.

In other words, the coordinate of the second position P2 in the first direction x is set equal to the value of the coordinate of the position in the first direction x at the end of the range of movement on the side where the movable unit 30a is moved in the first period, and the coordinate of the second position P2 in the second direction y is set equal to the value of the coordinate of the position in the second direction y at the end of the range of movement on the side where the movable unit 30a is moved in the first period.

In step S96, it is determined whether the value of the first movement quantity parameter XX is less than 0. When it is determined that the value of the first movement quantity parameter XX is less than 0, the operation proceeds directly to step S98. When it is determined that the value of the first movement quantity parameter XX is not less than 0, the operation continues to step S97.

In step S97, the value of the first end position parameter RFSPx is set equal to the value of the first horizontal end position $X^+LMT$, and the value of the second end position parameter RFSPy is set equal to the value of the second vertical end position $Y^-LMT$.

In other words, the coordinate of the second position P2 in the first direction x is set equal to the value of the coordinate of the position in the first direction x at the end of the range of movement on the side where the movable unit 30a is moved in the first period, and the coordinate of the second position P2 in the second direction y is set equal to the value of the coordinate of the position in the second direction y at the end of the range of movement on the side where the movable unit 30a is moved in the first period.

In step S98, the value of the first end position parameter RFSPx is set equal to the value of the second horizontal end position $X^-LMT$, and the value of the second end position parameter RFSPy is set equal to the value of the second vertical end position $Y^-LMT$.

In other words, the coordinate of the second position P2 in the first direction x is set equal to the value of the coordinate of the position in the first direction x at the end of the range of movement on the side where the movable unit 30a is moved in the first period, and the coordinate of the second position P2 in the second direction y is set equal to the value of the coordinate of the position in the second direction y at the end of the range of movement on the side where the movable unit 30a is moved in the first period.

In step S99, the value of the first end position parameter RFSPx is set equal to the value of the coordinate of position $P_n$ after A/D conversion in the first direction x: $pdx_n$ at the end of the first period (at the end of the first length of time following the completion of the anti-shake operation), and the value of the second end position parameter RFSPy is set equal to the value of the coordinate of position $P_n$ after A/D conversion in the second direction y: $pdy_n$ at the end of the first period (at the end of the first length of time following the completion of the anti-shake operation).

In other words, the coordinate of the second position P2 in the first direction x is set equal to the value of the coordinate of the position in the first direction x at the point in time when the first period is complete (after the first length of time has elapsed following the completion of the anti-shake operation), and the coordinate of the second position P2 in the second direction y is set equal to the value of the coordinate of the position in the second direction y at the point in time when the first period is complete (after the first length of time has elapsed following the completion of the anti-shake operation).

In an anti-shake apparatus that does not have a fixed-positioning mechanism so that the movable unit 30a remains stationary when the movable unit 30a is not being driven, such as the second embodiment, when the movement of the movable unit 30a is set to the OFF state after the anti-shake operation, the movable unit 30a is allowed to move freely according to the force of gravity until it is stopped upon making contact with the end of its range of movement. In the case where the impact between the movable unit 30a and the contacting part is large, the contacting part may be broken and the operator of the photographing apparatus 1 may experience discomfort due to the shock of the movable unit 30a.

In the second embodiment, when the anti-shake operation is complete, the control driving the movable unit 30a is set to the OFF state and the first length of time has elapsed (the first period is finished), the movable unit 30a is moved to the second position P2 over the course of the second length of time (90 ms). The second position P2 is determined on the basis of the movement direction of the movable unit 30a in the first period. The movement direction of the movable unit 30a is determined on the basis of a quantity of change between the position of the movable unit 30a at the point in time signaling the end of the anti-shake operation and the beginning of the first time period and the position of the movable unit 30a at the end of the first period.

Therefore, the position where the movable unit is moved according to the force of gravity when the anti-shake operation is finished and the control driving the movable unit 30*a* is set to the OFF state, is somewhere at the end of the range of movement and almost the same as the second position P2.

Further, the movement of the movable unit 30*a* to the second position P2 is performed over the course of the second length of time (90 ms), at a comparatively low speed (see FIG. 12). Particularly towards the end of the movement (when the movable unit 30*a* is near the second position P2), the movement of the movable unit 30*a* is performed at the low speed so that the shock based on the movement can be restrained.

Further, in the second embodiment, because the movement direction of the movable unit 30*a* immediately after the anti-shake operation is specified, even if the position of the photographing apparatus 1 held by the operator after the exposure time changes from the position of the photographing apparatus 1 held by the operator before the exposure time, the second position P2 can be (calculated) based on the direction of gravity.

Further, it is not necessary to add a separate detection apparatus for detecting the direction of gravity, such as a gravity detection sensor etc.

In the second embodiment, the CPU 21 controls the movement of the movable unit 30*a* under the condition where the relationship between the elapsed time and movement distance of the movable unit 30*a* is represented by a sine waveform (see FIG. 11). Specifically, under the control of the CPU 21, the movable unit 30*a* commences movement at the point in time signaling the end of the first length of time and the beginning of the second length of time (MRDN=30, the elapsed time t=30), and finishes movement at the point in time signaling the end of the second length of time (MRDN=120, the elapsed time t=120), after the completion of the anti-shake operation and the end of the first length of time.

In other words, the CPU 21 controls the movement of the movable unit 30*a* under the condition where the relationship between the elapsed time and movement speed of the movable unit 30*a* is represented by a cosine waveform (see FIG. 12). Specifically, under the control of the CPU 21, the movable unit 30*a* commences movement at the point in time signaling the end of the first length of time and the beginning of the second length of time (MRDN=30, the elapsed time t=30), and finishes movement at the point in time signaling the end of the second length of time (MRDN=120, the elapsed time t=120), after the completion of the anti-shake operation and the end of the first length of time.

However, the waveform representing the relationship between the elapsed time and the movement distance of the movable unit 30*a* from the point when the movement of the movable unit 30*a* commences, is not limited to the sine waveform.

For example, the waveform that represents the relationship between the movement distance of the movable unit 30*a* and the corresponding elapsed time from the point when the movement of the movable unit 30*a* commences, may be a saturation curve that the movement of the movable unit 30*a* follows at the low speed immediately before the completion of the movement of the movable unit 30*a* (MRDN=120).

Further, in the second embodiment, the photographing apparatus 1 is a single lens reflex camera that performs the mirror-up operation; however, the photographing apparatus 1 may not perform the mirror-up operation.

In the case where the photographing apparatus 1 that does not perform the mirror-up operation is used for the second embodiment, the movement of the movable unit 30*a* to the second position P2 commences after the anti-shake operation is finished and the first length of time has elapsed, and the movement of the movable unit 30*a* to the second position P2 is complete before the secondary processing, such as the image processing operation etc. is complete.

Further, the length of the first period is not limited to 30 ms, and the length of the second period is not limited to 90 ms. The sum of the first and second length of times is set to a length of time that is less than or equal to the length of time from the point when the anti-shake operation is finished to the point when the mirror-down operation is finished (or to the point when the secondary processing, such as the image processing operation etc. is finished). Therefore, the sum of the first and second length of times needs only to elapse (the second period is completed) before the completion of the mirror-down operation (or the point in time when the secondary processing is finished).

In the second embodiment, the sum of the first and second length of times is set to 120 ms (30 ms+90 ms), which is equal to the time length (approximately 120 ms) from the point when the mirror-down operation commences to the point when the mirror-down operation is complete. Further, the elapse of the second length of time (the second period ends) occurs before (or at the same time of) the completion of the mirror-down operation (or the time point when the secondary processing is finished).

Further, it is explained that the movable unit 30*a* has the imaging device; however, the movable unit 30*a* may have a hand-shake correcting lens instead of the imaging device.

Further, it is explained that the hall element is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall element.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2006-192863 (filed on Jul. 13, 2006) and 2006-192712 (filed on Jul. 13, 2006), which are expressly incorporated herein by reference, in their entirety.

What is claimed is:

1. An anti-shake apparatus for image stabilization, comprising:
   a movable unit that is movable for an anti-shake operation;
   a controller that stops said anti-shake operation after an exposure time and moves said movable unit to a first position after said anti-shake operation, said first position being a position of said movable unit before an exposure time and before said anti-shake operation, said controller moving said movable unit at a predetermined speed before finishing its movement to said first position; and
   a mirror that performs a mirror-up operation and a mirror-down operation, a predetermined length of time for moving said movable unit to said first position being shorter than a length of time from when said anti-shake operation is finished to when said mirror-down operation is finished.

2. The anti-shake apparatus according to claim 1, wherein a predetermined period having said predetermined length of time is finished when said mirror-down operation is finished.

3. The anti-shake apparatus according to claim 1, wherein the predetermined length of time for moving said movable unit to said first position is shorter than a length of time from when said anti-shake operation is finished to when the image processing operation is finished.

4. The anti-shake apparatus according to claim 1, wherein said controller controls the movement of said movable unit, under the condition where a relationship between a distance of said movement and an elapse of time corresponding to said movement to said first position is represented by a sine waveform during a predetermined period beginning with a commencement of movement of said movable unit to said first position and ending with a completion of movement of said movable unit to said first position.

5. The anti-shake apparatus according to claim 4, wherein a movement control of said movable unit for said anti-shake operation is performed at a predetermined time interval; and a length of time of said predetermined period is longer than said predetermined time interval.

6. An anti-shake apparatus for image stabilization, comprising:

a movable unit that is movable for an anti-shake operation;

a controller that stops said anti-shake operation after an exposure time and moves said movable unit to a first position after said anti-shake operation; and a mirror that performs a mirror-up operation and a mirror-down operation, said controller controlling a movement of said movable unit, under a condition where a relationship between a distance of said movement and an elapse of time corresponding to said movement to said first position is represented by a sine waveform during a predetermined period beginning with a commencement of movement of said movable unit to said first position and ending with a completion of movement of said movable unit to said first position, said movement of said movable unit to said first position being performed based on a position detection operation of said movable unit and a positioning operation in which a position to which said movable unit should be moved is determined, at a predetermined time interval that is shorter than said predetermined period, a predetermined length of time for moving said movable unit to said first position being shorter than a length of time from when said anti-shake operation is finished to when said mirror-down operation is finished.

\* \* \* \* \*